(12) United States Patent
Yadav et al.

(10) Patent No.: US 9,477,420 B2
(45) Date of Patent: *Oct. 25, 2016

(54) OVERWRITING PART OF COMPRESSED DATA WITHOUT DECOMPRESSING ON-DISK COMPRESSED DATA

(71) Applicant: NetApp, Inc., Sunnyvale, CA (US)

(72) Inventors: Sandeep Yadav, Santa Clara, CA (US); Rickard E. Faith, Hillsborough, NC (US); Subramaniam V. Periyagaram, San Jose, CA (US); Blake H. Lewis, Los Altos, CA (US); Ashish Prakash, Morrisville, NC (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/286,900

(22) Filed: May 23, 2014

(65) Prior Publication Data

US 2014/0258648 A1  Sep. 11, 2014

Related U.S. Application Data

(63) Continuation of application No. 13/099,283, filed on May 2, 2011, now Pat. No. 8,745,338.

(51) Int. Cl.
*G06F 9/00* (2006.01)
*G06F 9/315* (2006.01)
*G06F 3/06* (2006.01)
*G06F 17/30* (2006.01)

(52) U.S. Cl.
CPC .............. *G06F 3/064* (2013.01); *G06F 3/061* (2013.01); *G06F 3/067* (2013.01); *G06F 3/0619* (2013.01); *G06F 3/0689* (2013.01); *G06F 17/30153* (2013.01); *G06F 2211/1014* (2013.01); *G06F 2212/401* (2013.01)

(58) Field of Classification Search
CPC .......... G06F 2212/401; G06F 8/4434; G06F 2211/007; G06F 2211/1014; G06F 17/30153; G06F 3/0608

See application file for complete search history.

(56) References Cited

U.S. PATENT DOCUMENTS

| 5,930,167 A | 7/1999 | Lee et al. |
| 6,178,489 B1 | 1/2001 | Singh |
| 6,192,432 B1 | 2/2001 | Slivka et al. |
| 6,360,300 B1 | 3/2002 | Corcoran et al. |
| 6,446,145 B1 | 9/2002 | Har et al. |

(Continued)

FOREIGN PATENT DOCUMENTS

WO    2010040078    4/2010

OTHER PUBLICATIONS

"U.S. Appl. No. 13/099,283 Final Office Action", Dec. 17, 2013, 14 pages.

(Continued)

*Primary Examiner* — David X Yi
*Assistant Examiner* — Candice Rankin
(74) *Attorney, Agent, or Firm* — Gilliam IP PLLC

(57) ABSTRACT

Partially overwriting a compression group without decompressing compressed data can consumption of resources for the decompression. A storage server partially overwrites the compression group when a file block identifier of a client's write request resolves to the compression group. The compression group remains compressed while the partial overwriting is performed.

17 Claims, 14 Drawing Sheets

(56) References Cited

U.S. PATENT DOCUMENTS

| | | |
|---|---|---|
| 6,851,082 B1 | 2/2005 | Corbett |
| 6,857,047 B2 | 2/2005 | Basu et al. |
| 7,200,603 B1 | 4/2007 | Hitz et al. |
| 7,321,962 B1 | 1/2008 | Fair et al. |
| 7,496,586 B1 | 2/2009 | Bonwick et al. |
| 7,562,203 B2 | 7/2009 | Scott et al. |
| 7,664,791 B1 | 2/2010 | Hamilton |
| 7,702,870 B2 | 4/2010 | English et al. |
| 7,730,277 B1 | 6/2010 | Prakash et al. |
| 7,870,172 B1 | 1/2011 | Sarma |
| 7,970,965 B2 | 6/2011 | Kedem et al. |
| 8,037,349 B2 | 10/2011 | Mandagere et al. |
| 8,099,571 B1 | 1/2012 | Driscoll et al. |
| 8,539,008 B2 | 9/2013 | Faith et al. |
| 8,600,949 B2 | 12/2013 | Periyagaram et al. |
| 8,745,338 B1 | 6/2014 | Yadav et al. |
| 8,924,440 B2 | 12/2014 | Faith et al. |
| 9,043,555 B1 | 5/2015 | Khona et al. |
| 2005/0108296 A1 | 5/2005 | Nakamura et al. |
| 2006/0184505 A1* | 8/2006 | Kedem et al. ............... 707/1 |
| 2006/0212672 A1* | 9/2006 | Chandrasekaran et al. .. 711/171 |
| 2007/0083571 A1 | 4/2007 | Meller et al. |
| 2007/0130431 A1 | 6/2007 | Sano |
| 2009/0265399 A1 | 10/2009 | Cannon et al. |
| 2009/0268903 A1 | 10/2009 | Bojinov et al. |
| 2010/0058002 A1* | 3/2010 | Voll et al. ............... 711/154 |
| 2010/0094817 A1 | 4/2010 | Ben-Shaul et al. |
| 2010/0131480 A1 | 5/2010 | Schneider |
| 2010/0174879 A1* | 7/2010 | Pawar et al. ............... 711/161 |
| 2010/0274772 A1 | 10/2010 | Samuels |
| 2010/0274773 A1* | 10/2010 | Pawar et al. ............... 707/693 |
| 2011/0016095 A1 | 1/2011 | Anglin et al. |
| 2011/0055621 A1 | 3/2011 | Mandagere et al. |
| 2011/0252184 A1 | 10/2011 | Cho et al. |
| 2012/0330903 A1 | 12/2012 | Periyagaram et al. |
| 2013/0073519 A1 | 3/2013 | Lewis et al. |

OTHER PUBLICATIONS

"U.S. Appl. No. 13/099,283 Office Action", Jun. 24, 2013, 12 pages.

Moulton, "Data Compression for NetApp Storage", from http://community.netapp.com/t5/Tech-On Tap-Articles/Data-Compression-for -NetApp-Storage/ta-p/86162, Retrieved on Oct. 7, 2015, 5 pages.

Notice of Allowance mailed May 16, 2013 for U.S. Appl. No. 13/098,310, filed Apr. 29, 2011, 16 pages.

"U.S. Appl. No. 12/769,623 Final Office Action", Jan. 3, 2013 00:00:00.0, 16 pages.

"U.S. Appl. No. 12/769,623 Final Office Action", Jun. 6, 2014 00:00:00.0, 15 pages.

"U.S. Appl. No. 12/769,623 Office Action", Mar. 27, 2012 00:00:00.0, 12 pages.

"U.S. Appl. No. 12/769,623 Office Action", Oct. 4, 2013 00:00:00.0, 17 pages.

* cited by examiner

OVERWRITING PART OF COMPRESSED DATA WITHOUT DECOMPRESSING ON-DISK COMPRESSED DATA

RELATED APPLICATIONS

This application is a Continuation of and claims the priority benefit of U.S. application Ser. No. 13/099,283 filed May 2, 2011.

FIELD

At least one feature of the disclosure pertains to data storage systems, and more particularly, to overwriting part of compressed data without decompressing on-disk compressed data in an extent-based storage architecture.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2011, NetApp, Inc., All Rights Reserved.

BACKGROUND

Various forms of network-based storage systems exist today. These forms include network attached storage (NAS), storage area networks (SAN's), and others. Network-based storage systems are commonly used for a variety of purposes, such as providing multiple users with access to shared data, backing up critical data (e.g., by data mirroring), etc.

A network-based storage system typically includes at least one storage server, which is a processing system configured to store and retrieve data on behalf of one or more client processing systems (clients). The data is stored and retrieved as storage objects, such as blocks and/or files. A block is a sequence of bytes or bits of data having a predetermined length. A file is a collection of related bytes or bits having an arbitrary length. In the context of NAS, a storage server operates on behalf of one or more clients to store and manage file-level access to data. In the context of NAS, a storage server may be a file server, which is sometimes called a "filer". A filer operates on behalf of one or more clients to store and manage shared files. The files may be stored in a storage system that includes one or more arrays of mass storage devices, such as magnetic or optical disks or tapes, by using a data storage scheme such as Redundant Array of Inexpensive Disks (RAID). Additionally, the mass storage devices in each array may be organized into one or more separate RAID groups. In a SAN context, a storage server provides clients with block-level access to stored data, rather than file-level access. Some storage servers are capable of providing clients with both file-level access and block-level access, such as certain storage servers made by NetApp, Inc. (NetApp®) of Sunnyvale, Calif.

FIG. 1 is an illustrative example of a Write Anywhere File Layout (WAFL) file system. Referring to FIG. 1, WAFL aggregate 100 is an instance of the WAFL file system. WAFL aggregate 100 includes one or more flexible volumes 110, one or more volume containers 120, and physical storage 130.

WAFL aggregate 100 is a physical storage container that can store data in the WAFL file system. Flexible volume 110 is a logical volume that allows the virtualization of the allocation of volumes on physical storage 130. Thereby multiple, independently managed flexible volumes 110 can share the same physical storage (e.g., physical storage 130). The virtualization requires mapping between virtual volume block numbers (VVBNs) used by flexible volume 110 and physical volume block numbers (PVBNs) used by WAFL aggregate 100 to access data stored in physical storage 130. A PVBN, as used herein, refers disk blocks that have been abstracted into a single linear sequence in the aggregate. Each volume container 120 corresponds to a flexible volume 110. Volume container 120 contains all the data blocks for a corresponding flexible volume 110.

As used herein, a block offset or an offset refers to a distance in blocks from the beginning of a storage object such as a volume, file, extent, etc. Block addresses used within flexible volume 110 refer to block offsets within volume container 120. Since volume container 120 contains every block within flexible volume 110, there are two ways to refer to the location of a particular block. The PVBN specifies the location of a block within WAFL aggregate 100. The VVBN specifies the offset of the block within the container file. When a block in a file is requested, flexible volume 110 translates the file offset into a VVBN. The VVBN is passed from flexible volume 110 to volume container 120. Volume container 120 translates the VVBN to a PVBN. The PVBN is then used to access the requested block in physical storage 130. Once a VVBN has been translated into a PVBN, the block pointer for the PVBN in flexible volume 110 is updated to include (e.g., in a cache) the PVBN for the VVBN. Thereby, the next time the requested block is required, the flexible volume 110 can use the stored PVBN to access physical storage 130.

Current examples of WAFL define a file as a tree of indirect blocks. Each indirect block in the tree has a fixed span: a fixed number of entries, each pointing to another block in the tree. Extents are represented using an entry for each block within the extent. An extent, as used herein, refers a contiguous group of one or more blocks. As a result, the amount of indirect block metadata is linear with respect to the size of the file. Additionally, disk gardening techniques, such as segment cleaning, file reallocation, etc., are complicated by caching PVBN pointers in VVBN blocks.

Storage systems often use a predetermined block size for all internal operations. For example, WAFL uses 4 KB (e.g., 4096 bytes) blocks for both VVBN and PVBN, as do client-side file systems for file block numbers (FBN). Block boundaries are expected to occur every 4 KB from an initial offset (e.g., FBN 0). Since file systems usually offset individual files based on these block boundaries, application writers take advantage of a file system's block size and alignment to increase the performance of their input/output ("I/O") operations—for example, always performing I/O operations that are a multiple of 4 KB, and always aligning these operations to the beginning of a file. Other file systems or applications, such as a virtual machine, may use a block boundary of a different size (e.g., a virtual machine environment in which an initial master boot record block of 512 bytes is followed by the expected 4 KB blocks), resulting in misalignment between FBN's and PVBN's. Additionally, multiple virtual machines may share a single volume container 120 and each virtual machine may misaligned by a different amount.

Compression groups data blocks together to make a compression group. The data blocks in the compression group are compressed in a smaller number of physical data blocks than the number of logical data blocks. A typical compression group requires 8 (eight) logical data blocks to be grouped together such that compressed data can be stored in less than 8 physical data blocks. This mapping between physical data blocks and logical data blocks requires the compression groups to be written as a single data block. Therefore, the compression group is written to disk in full.

When a compression group is partially written by a user (e.g., one logical data block is modified in a compression group of 8 logical data blocks), all physical data blocks in the compression group are read, the physical data blocks in the compression group are uncompressed, and the modified data block is merged with the uncompressed data. If the system is using inline compression, then compression of modified compression groups is performed immediately prior to writing out data to a disk, and the compressed groups are all written out to disk. If a system is using background compression, then the compression of a modified compression group is performed in the background once the compression group has been modified, and the compressed data is written to disk. Random partial writes (partial writes to different compression groups) can therefore greatly affect performance of the storage system. In fact, write performance can be up to 15 times slower for compressed volumes than for uncompressed volumes. Therefore, although compression provides storage savings, the degradation of performance may be disadvantageous enough to not do compression in a storage system.

SUMMARY

Overwriting part of compressed data without decompressing on-disk compressed data includes receiving a write request for a block of data in a compression group from a client, wherein the compression group comprises a group of data blocks that is compressed, wherein the block of data is uncompressed. The storage server partially overwrites the compression group, wherein the compression group remains compressed while the partial overwriting is performed. The storage server determines whether the partially overwritten compression group including the uncompressed block of data should be compressed. The storage server defers compression of the partially overwritten compression group if the partially overwritten compression group should not be compressed. The storage server compresses the partially overwritten compression group if the partially overwritten compression group should be compressed.

BRIEF DESCRIPTION OF THE DRAWINGS

One or more features of the disclosure are illustrated by way of example and not limitation in the figures of the accompanying drawings, in which like references indicate similar elements and in which.

DETAILED DESCRIPTION

In the following detailed description, reference is made to the accompanying drawings in which like references indicate similar elements, and in which is shown by way of illustration specific features of the disclosure that may be practiced. These features are described in sufficient detail to enable those skilled in the art to practice the features of the disclosure, and it is to be understood that other features may be utilized and that logical, mechanical, electrical, functional, and other changes may be made without departing from the scope of the disclosure. The following detailed description is, therefore, not to be taken in a limiting sense, and the scope of the disclosure is defined only by the appended claims.

As set forth in further detail below, features are described for overwriting part of compressed data without decompressing on-disk compressed data. Overwriting part of compressed data without decompressing on-disk compressed data can include receiving a write request for a block of data in a compression group from a client, wherein the compression group comprises a group of data blocks that is compressed, wherein the block of data is uncompressed. The storage server partially overwrites the compression group, wherein the compression group remains compressed while the partial overwriting is performed. The storage server determines whether the partially overwritten compression group including the uncompressed block of data should be compressed. The storage server defers compression of the partially overwritten compression group if the partially overwritten compression group should not be compressed. The storage server compresses the partially overwritten compression group if the partially overwritten compression group should be compressed.

Overwriting part of compressed data without decompressing on-disk compressed data allows the compressed data to remain compressed while the overwrite occurs. Thus, overwriting part of compressed data does not require uncompressing the data prior to overwriting it. Thus, the partial overwrite of compressed data has almost the same performance as overwrites in a non-compressed volume. Therefore, compression can be used more easily in storage servers, allowing data to be stored more efficiently.

Figure 1:
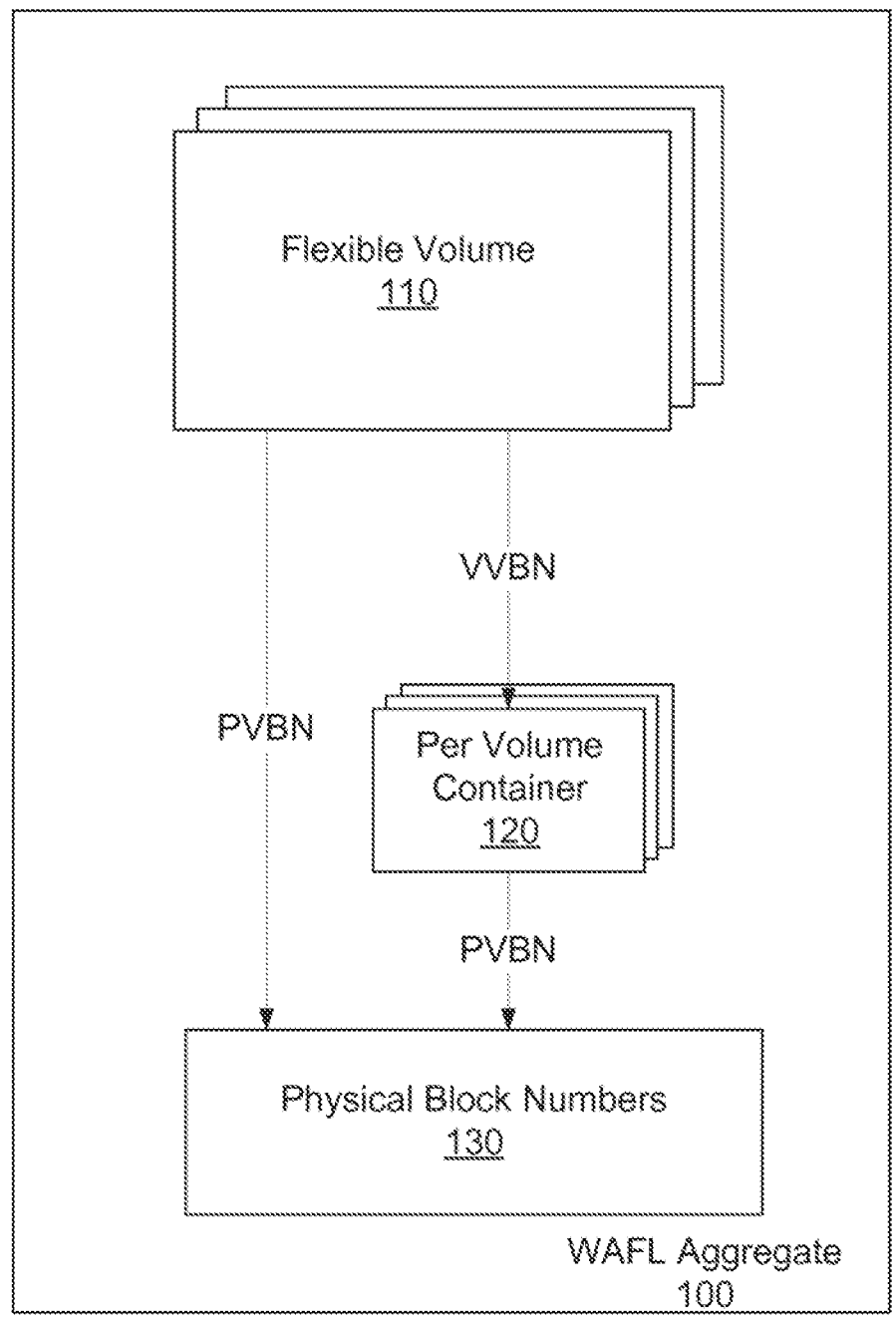
FIG. 1 illustrates an example of a Write Anywhere File Layout.
Figure 2A:
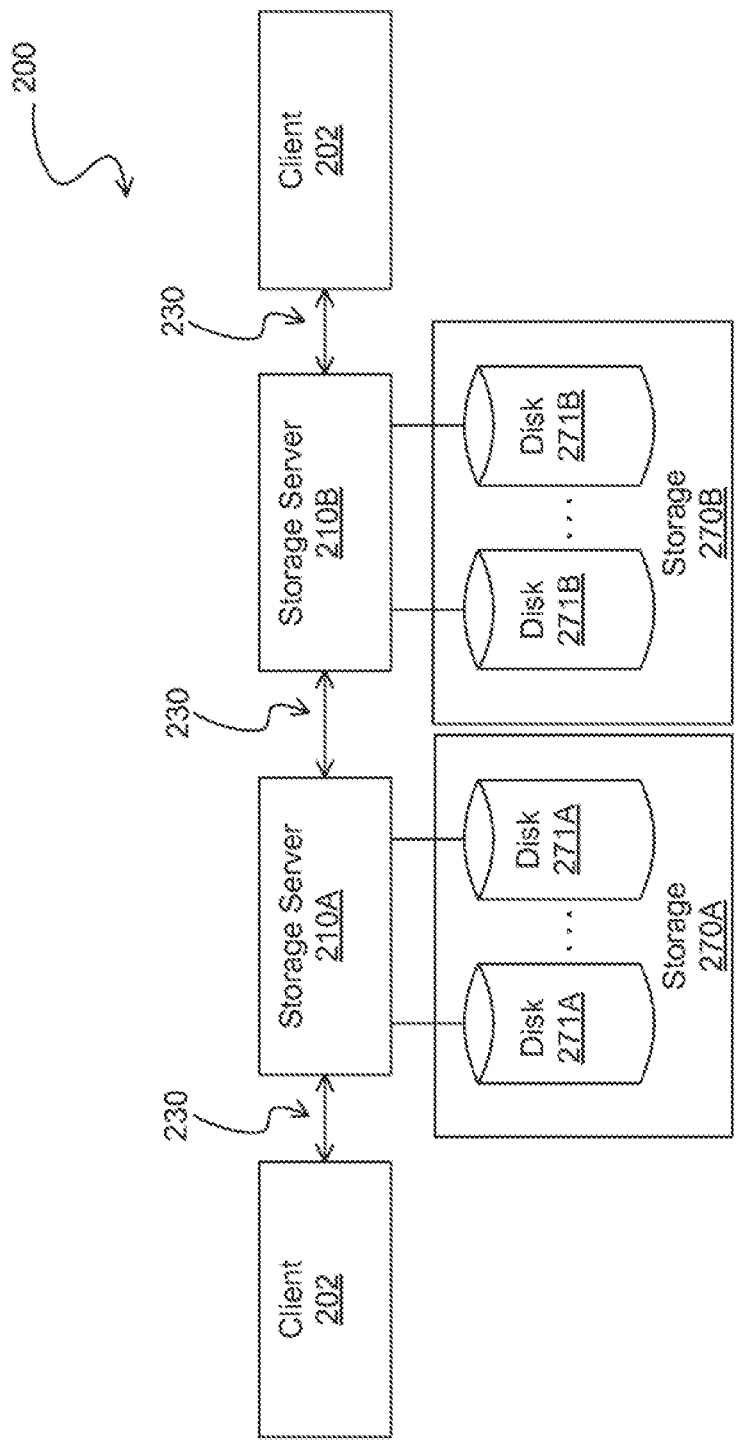
FIG. 2A illustrates a network storage system for an extent-based storage architecture.

FIG. 2A shows a network storage system 200 for an extent-based storage architecture 495. Storage servers 210 (storage servers 210A, 210B) each manage multiple storage units 270 (storage 270A, 270B) that include mass storage devices. These storage servers 210 provide data storage services to one or more clients 202 through a network 230. Network 230 may be, for example, a local area network (LAN), wide area network (WAN), metropolitan area network (MAN), global area network (GAN) such as the Internet, a Fibre Channel fabric, or any combination of such interconnects. Each of clients 202 may be, for example, a conventional personal computer (PC), server-class computer, workstation, handheld computing or communication device, a virtual machine, or other special or general purpose computer.

Storage of data in storage units 270 is managed by storage servers 210 which receive and respond to various I/O requests from clients 202, directed to data stored in or to be stored in storage units 270. Data is accessed (e.g., in response to the I/O requests) in units of data blocks, which in some aspects are 4 KB in size, although other data block sizes (e.g., 512 bytes, 2 KB, 8 KB, etc.) may also be used. In one aspect, 4 KB as used herein refers to 4,096 bytes. For alternative aspects, 4 KB refers to 4,000 bytes. Storage units 270 constitute mass storage devices which can include, for example, flash memory, magnetic or optical disks, or tape drives, illustrated as disks 271 (271A, 271B). The storage devices 271 can further be organized into arrays (not illustrated) of a Redundant Array of Inexpensive Disks/Devices (RAID) scheme, whereby storage servers 210 access storage units 270 using one or more RAID protocols. RAID is a data storage scheme that divides and replicates data among multiple hard disk drives—e.g., in stripes of data. Data striping is the technique of segmenting logically sequential data, such as a single file, so that segments can be assigned to multiple physical devices/hard drives. Redundant (parity) data is stored to allow problems to be detected and possibly fixed. For example, if one were to configure a hardware-based RAID-5 volume using three 250 GB hard drives (two drives for data, and one for parity), the operating system would be presented with a single 500 GB volume and the example single file may be stored across the two data drives. Although illustrated as separate components, a storage server 210 and storage unit 270 may be a part of/housed within a single device.

Storage servers 210 can provide file-level service such as used in a network-attached storage (NAS) environment, block-level service such as used in a storage area network (SAN) environment, a service which is capable of providing both file-level and block-level service, or any other service capable of providing other data access services. Although storage servers 210 are each illustrated as single units in FIG. 2A, a storage server can, in other aspects, constitute a separate network element or module (an "N-module") and disk element or module (a "D-module"). According to one feature, the D-module includes storage access components for servicing client requests. In contrast, the N-module includes functionality that enables client access to storage access components (e.g., the D-module) and may include protocol components, such as Common Internet File System (CIFS), Network File System (NFS), or an Internet Protocol (IP) module, for facilitating such connectivity. Details of a distributed architecture environment involving D-modules and N-modules are described further below with respect to FIG. 2B and aspects of a D-module and a N-module are described further below with respect to FIG. 4.

In yet other aspects, storage servers 210 are referred to as network storage subsystems. A network storage subsystem provides networked storage services for a specific application or purpose. Examples of such applications include database applications, web applications, Enterprise Resource Planning (ERP) applications, etc., e.g., executable by a client. Examples of such purposes include file archiving, backup, mirroring, etc., provided, for example, on archive, backup, or secondary storage server connected to a primary storage server. A network storage subsystem can also include a collection of networked resources provided across multiple storage servers and/or storage units.

In the example illustrated in FIG. 2A, one of the storage servers (e.g., storage server 210A) functions as a primary provider of data storage services to client 202. Data storage requests from client 202 are serviced using disks 271A organized as one or more storage objects. A secondary storage server (e.g., storage server 210B) takes a standby role in a mirror relationship with the primary storage server, replicating storage objects from the primary storage server to storage objects organized on disks of the secondary storage server (e.g., disks 270B). In operation, the secondary storage server does not service requests from client 202 until data in the primary storage object becomes inaccessible such as in a disaster with the primary storage server, such event considered a failure at the primary storage server. Upon a failure at the primary storage server, requests from client 202 intended for the primary storage object are serviced using replicated data (i.e. the secondary storage object) at the secondary storage server.

It will be appreciated that in other aspects, network storage system 200 may include more than two storage servers. In these cases, protection relationships may be operative between various storage servers in system 200 such that one or more primary storage objects from storage server 210A may be replicated to a storage server other than storage server 210B (not shown in this figure). Secondary storage objects may further include protection relationships with other storage objects such that the secondary storage objects are replicated, e.g., to tertiary storage objects, to protect against failures with secondary storage objects. Accordingly, the description of a single-tier protection relationship between primary and secondary storage objects of storage servers 210 should be taken as illustrative only.

Figure 2B:
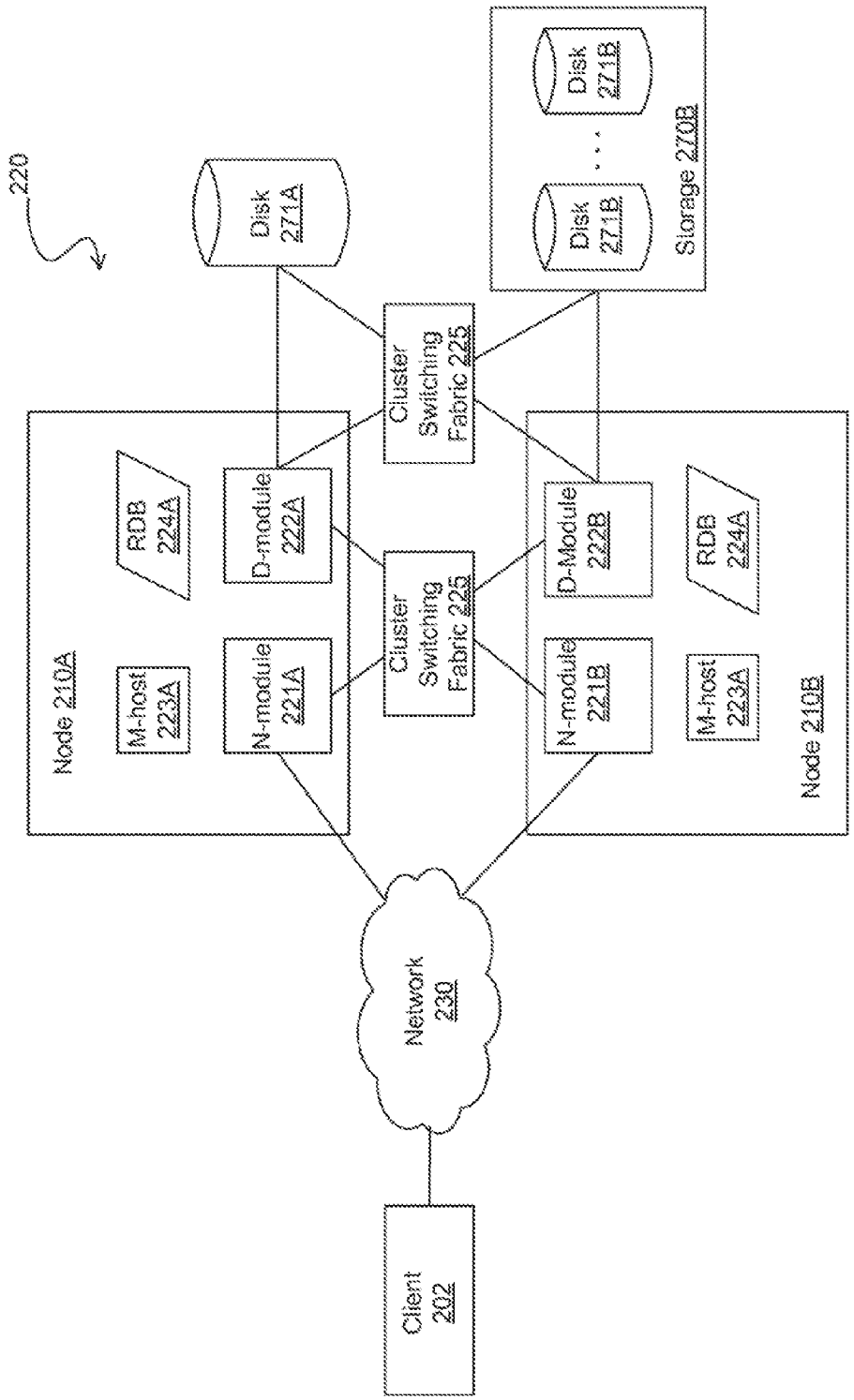
FIG. 2B illustrates a distributed or clustered architecture for a network storage system for an extent-based storage architecture.

FIG. 2B illustrates a block diagram of a distributed or clustered network storage system 220. System 220 may include storage servers shown as nodes 210 (nodes 210A, 210B) which are each configured to provide access to storage devices 271. In FIG. 2B, nodes 210 are interconnected by a cluster switching fabric 225, which may be embodied as an Ethernet switch.

Nodes 210 may be operative as multiple functional components that cooperate to provide a distributed architecture of system 220. To that end, each node 210 may be organized as a network element or module (N-module 221A, 221B), a disk element or module (D-module 222A, 222B), and a management element or module (M-host 223A, 223B). In one aspect, each module includes a processor and memory for carrying out respective module operations. For example, N-module 221 may include functionality that enables node 210 to connect to client 202 via network 230 and may include protocol components such as a media access layer, Internet Protocol (IP) layer, Transport Control Protocol (TCP) layer, User Datagram Protocol (UDP) layer, and other protocols known in the art.

In contrast, D-module 222 may connect to one or more storage devices 271 via cluster switching fabric 225 and may be operative to service access requests on devices 270. In one aspect, the D-module 222 provides an extent-based storage architecture 495 and a partial overwrite module 498, as will be described in greater detail below. In one aspect, the D-module 222 includes storage access components such as a storage abstraction layer supporting multi-protocol data access (e.g., Common Internet File System protocol, the Network File System protocol, and the Hypertext Transfer Protocol), a storage layer supporting storage protocols (e.g., RAID protocol), and a driver layer supporting storage device protocols (e.g., Small Computer Systems Interface protocol) for carrying out operations in support of storage access operations. In the aspect shown in FIG. 2B, a storage abstraction layer (e.g., file system) of the D-module divides the physical storage of devices 270 into storage objects. Requests received by node 210 (e.g., via N-module 221) may thus include storage object identifiers to indicate a storage object on which to carry out the request.

Also operative in node 210 is M-host 223 which provides cluster services for node 210 by performing operations in support of a distributed storage system image, for instance, across system 220. M-host 223 provides cluster services by managing a data structure such as a RDB 224 (RDB 224A, RDB 224B) which contains information used by N-module 221 to determine which D-module 222 "owns" (services) each storage object. The various instances of RDB 224 across respective nodes 210 may be updated regularly by M-host 223 using conventional protocols operative between each of the M-hosts (e.g., across network 230) to bring them into synchronization with each other. A client request received by N-module 221 may then be routed to the appropriate D-module 222 for servicing to provide a distributed storage system image.

It should be noted that while FIG. 2B shows an equal number of N- and D-modules constituting a node in the illustrative system, there may be different number of N- and D-modules constituting a node in accordance with various features of overwriting part of compressed data without decompressing on-disk compressed data. For example, there may be a number of N-modules and D-modules of node 210A that does not reflect a one-to-one correspondence between the N- and D-modules of node 210B. As such, the description of a node comprising one N-module and one D-module for each node should be taken as illustrative only.

Figure 3:
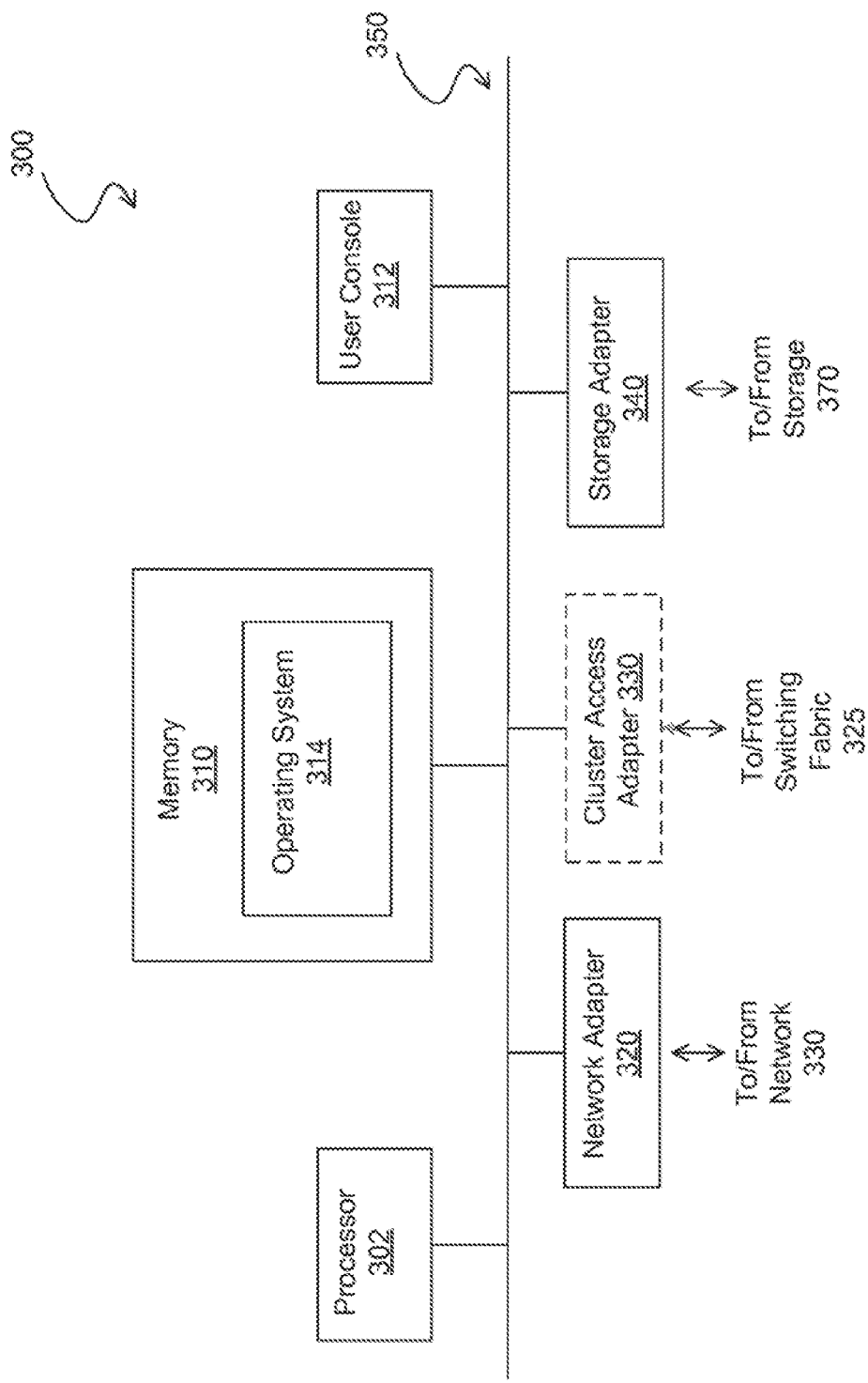
FIG. 3 is a block diagram of an illustrative of an example hardware architecture of a storage server for an extent-based storage architecture.

FIG. 3 is a block diagram of an example storage server 300, such as storage servers 210A and 210B of FIG. 2A, including a general or special purpose computer including a processor 302, a memory 310, a network adapter 320, a user console 312 and a storage adapter 340 interconnected by a system bus 350, such as a convention Peripheral Component Interconnect (PCI) bus. Certain standard and well-known components, which are not germane to the understanding of disclosure, are not shown.

The processor 302 is the central processing unit (CPU) of the storage server 210 and, thus, control its overall operation. The processor 302 accomplishes this by executing software stored in memory 310. For one feature, multiple processors 302 or one or more processors 302 with multiple cores are included in the storage server 210. For one feature, individual adapters (e.g., network adapter 320 and storage adapter 340) each include a processor and memory for carrying out respective module operations.

Memory 310 includes storage locations addressable by processor 302, network adapter 320 and storage adapter 340 for storing processor-executable instructions and data structures associated with an extent-based storage architecture. Storage operating system 314, portions of which are typically resident in memory 310 and executed by processor 302, functionally organizes the storage server 210 by invoking operations in support of the storage services provided by the storage server 210. It will be apparent to those skilled in the art that other processing means may be used for executing instructions and other memory means, including various computer readable media, may be used for storing program instructions pertaining to the inventive techniques described herein. It will also be apparent that some or all of the functionality of the processor 302 and executable software can be provided by hardware, such as integrated currents configured as programmable logic arrays, ASICs, and the like.

Network adapter 320 comprises one or more ports to couple the storage server to one or more clients over point-to-point links or a network. Thus, network adapter 320 includes the mechanical, electrical and signaling circuitry needed to couple the storage server to one or more client over a network. The network adapter 320 may include protocol components such as a Media Access Control (MAC) layer, Common Internet File System (CIFS), Network File System (NFS), Internet Protocol (IP) layer, Transport Control Protocol (TCP) layer, User Datagram Protocol (UDP) layer, and other protocols known in the art for facilitating such connectivity. Each client may communicate with the storage server over the network by exchanging discrete frames or packets of data according to pre-defined protocols, such as TCP/IP.

Storage adapter 340 includes a plurality of ports having input/output (I/O) interface circuitry to couple the storage devices (e.g., disks) to bus 321 over an I/O interconnect arrangement, such as a conventional high-performance, FC or SAS link topology. Storage adapter 340 typically includes a device controller (not illustrated) comprising a processor and a memory for controlling the overall operation of the storage units in accordance with read and write commands received from storage operating system 314. In one aspect, the storage operating system 314 provides an extent-based storage architecture 495 and a partial overwrite module 498, as will be described in greater detail below. As used herein, data written by a device controller in response to a write command is referred to as "write data," whereas data read by device controller responsive to a read command is referred to as "read data."

User console 312 enables an administrator to interface with the storage server to invoke operations and provide inputs to the storage server using a command line interface (CLI) or a graphical user interface (GUI). In one aspect, user console 312 includes a monitor and keyboard.

When included as a node of a cluster, such as cluster 220 of FIG. 2B, the storage server further includes a cluster access adapter 330 (shown in phantom/broken lines) having one or more ports to couple the node to other nodes in a cluster. In one aspect, Ethernet is used as the clustering protocol and interconnect media, although it will be apparent to one of skill in the art that other types of protocols and interconnects can by utilized within the cluster architecture.

Figure 4:
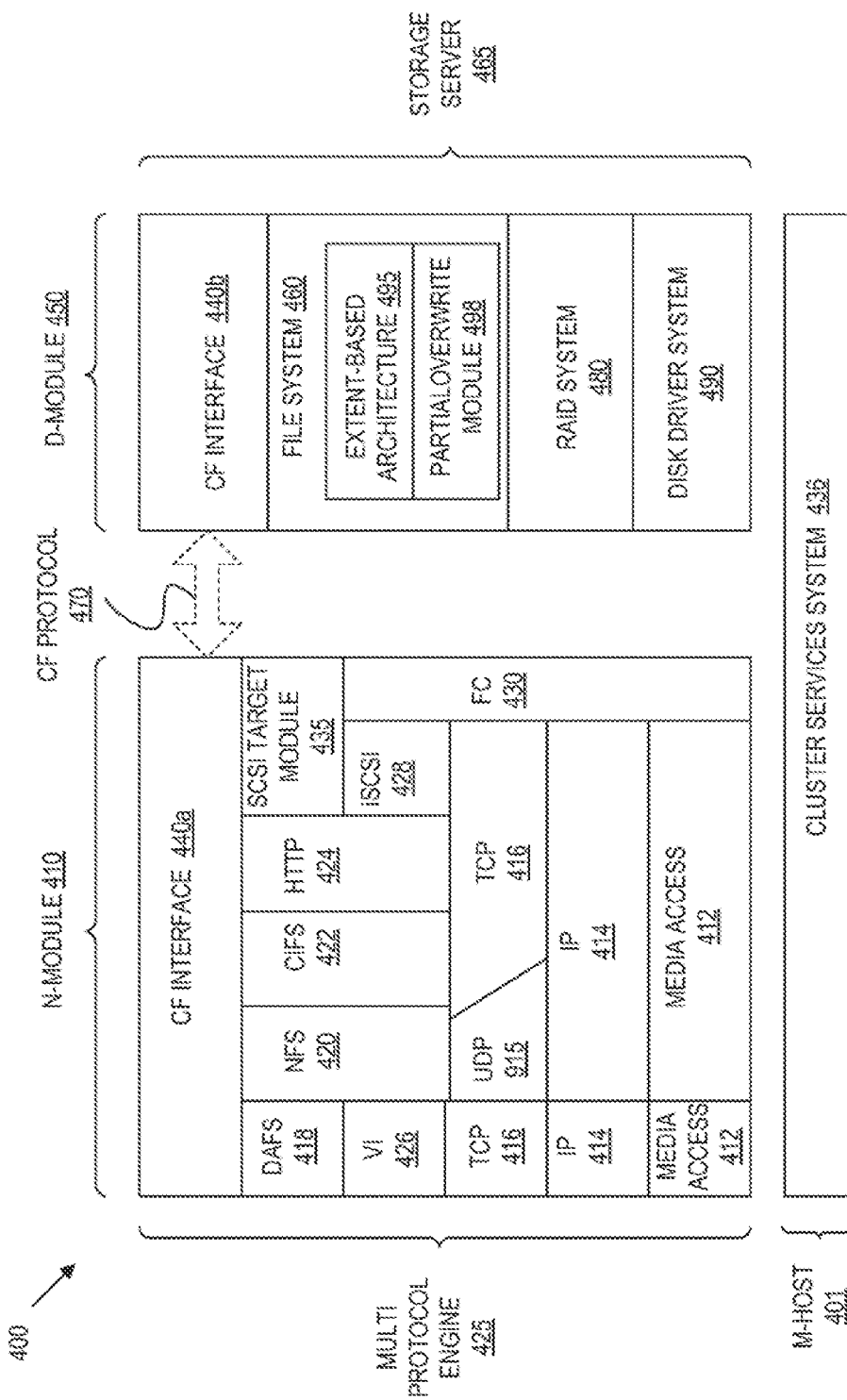
FIG. 4 illustrates features of the storage operating system of FIG. 3 for an extent-based storage architecture.

FIG. 4 is a block diagram of a storage operating system, such as storage operating system 314 of FIG. 3, that includes an extent-based architecture. The storage operating system comprises a series of software layers executed by a processor, such as processor 302 of FIG. 3, and organized to form an integrated network protocol stack or, more generally, a multi-protocol engine 425 that provides data paths for clients to access information stored on the storage server using block and file access protocols.

Multi-protocol engine 425 includes a media access layer 412 of network drivers (e.g., gigabit Ethernet drivers) that interface with network protocol layers, such as the IP layer 414 and its supporting transport mechanisms, the TCP layer 416 and the User Datagram Protocol (UDP) layer 415. A file system protocol layer provides multi-protocol file access and, to that end, includes support for the one or more of the Direct Access File System (DAFS) protocol 418, the NFS protocol 420, the CIFS protocol 422 and the Hypertext Transfer Protocol (HTTP) protocol 424. A VI layer 426 provides the VI architecture to provide direct access transport (DAT) capabilities, such as RDMA, as required by the DAFS protocol 418. An iSCSI driver layer 428 provides block protocol access over the TCP/IP network protocol layers, while a FC driver layer 430 receives and transmits block access requests and responses to and from the storage server. In certain cases, a Fibre Channel over Ethernet (FCoE) layer (not shown) may also be operative in multi-protocol engine 425 to receive and transmit requests and responses to and from the storage server. The FC and iSCSI drivers provide respective FC- and iSCSI-specific access control to the blocks and, thus, manage exports of LUNs to either iSCSI or FCP or, alternatively, to both iSCSI and FCP when accessing data blocks on the storage server.

The storage operating system also includes a series of software layers organized to form a storage server 465 that provides data paths for accessing information stored on storage devices. Information may include data received from a client, in addition to data accessed by the storage operating system in support of storage server operations such as program application data or other system data. Preferably, client data may be organized as one or more logical storage objects (e.g., volumes) that comprise a collection of storage devices cooperating to define an overall logical arrangement. In one aspect, the logical arrangement may involve logical volume block number (VBN) spaces, wherein each volume is associated with a unique VBN.

The file system 460 includes a virtualization system of the storage operating system through the interaction with one or more virtualization modules (illustrated as a SCSI target module 435). The SCSI target module 435 is generally disposed between drivers 428, 430 and the file system 460 to provide a translation layer between the data block (LUN) space and the file system space, where LUNs are represented as data blocks. In one aspect, the file system 460 provides a WAFL file system having an on-disk format representation that is block-based using, e.g., 4 KB blocks and using a data structure such as index nodes ("inodes") to identify files and file attributes (such as creation time, access permissions, size and block location). File system 460 uses files to store metadata describing the layout of its file system, including an inode file, which directly or indirectly references (points to) the underlying data blocks of a file.

For one feature, the file system 460 includes an extent-based architecture 495 as an extension to WAFL. Operationally, a request from a client is forwarded as a packet over the network and onto the storage server where it is received at a network adapter. A network driver such as layer 412 or layer 430 processes the packet and, if appropriate, passes it on to a network protocol and file access layer for additional processing prior to forwarding to file system 460. There, file system 460 generates operations to load (retrieve) the requested data from the disks if it is not resident "in core", i.e., in memory 310. If the information is not in memory, file system 460, in cooperation with the extent-based architecture 495, accesses an indirect volume to retrieve an extent identifier, accesses an extent-to-physical block map to retrieve a PVBN as described in greater detail with reference to FIGS. 5-14. For one aspect, the file system 460 passes the PVBN to the RAID system 480. There, the PVBN is mapped to a disk identifier and device block number (disk, DBN) and sent to an appropriate driver of disk driver system 490. The disk driver accesses the DBN from the specified disk and loads the requested data block(s) in memory for processing by the storage server. Upon completion of the request, the node (and operating system 400) returns a reply to the client over the network.

It should be noted that the software "path" through the storage operating system layers described above needed to perform data storage access for the client request received at the storage server adaptable to the teachings of the disclosure may alternatively be provided in hardware. That is, according to alternative aspects, a storage access request data path may be provided as logic circuitry embodied within a field programmable gate array (FPGA) or an application specific integrated circuit (ASIC). This type of hardware can increase the performance of the storage service provided by the storage server in response to a request issued by a client. Moreover, in another alternate aspect, the processing elements of adapters 320, 340 may be configured to offload some or all of the packet processing and storage access operations, respectively, from processor 302, to thereby increase the performance of the storage service provided by the storage server. It is expressly contemplated that the various processes, architectures and procedures described herein can be provided in hardware, firmware or software.

When included in a cluster, data access components of the storage operating system may be embodied as D-module 450 for accessing data stored on disk. In contrast, multi-protocol engine 425 may be embodied as N-module 410 to perform protocol termination with respect to a client issuing incoming access over the network, as well as to redirect the access requests to any other N-module in the cluster. A cluster services system 436 may further include an M-host (e.g., M-host 401) to provide cluster services for generating information sharing operations to present a distributed file system image for the cluster. For instance, media access layer 412 may send and receive information packets between the various cluster services systems of the nodes to synchronize the replicated databases in each of the nodes.

In addition, a cluster fabric (CF) interface module 440 (CF interface modules 440A, 440B) may facilitate intra-cluster communication between N-module 410 and D-module 450 using a CF protocol 470. For instance, D-module 450 may expose a CF application programming interface (API) to which N-module 410 (or another D-module not shown) issues calls. To that end, CF interface module 440 can be organized as a CF encoder/decoder using local procedure calls (LPCs) and remote procedure calls (RPCs) to communicate a file system command to between D-modules residing on the same node and remote nodes, respectively.

Although features are shown herein to provide an extent-based architecture within the illustrated components and layers of a storage server, it will be appreciated that an extent-based architecture may be provided in other modules or components of the storage server according to other aspects. In addition, an extent-based architecture may include a combination of a software-executing processor, hardware or firmware within the storage server. As such, an extent-based architecture may directly or indirectly interface with modules of the storage operating system in accordance with teachings of the disclosure.

As used herein, the term "storage operating system" generally refers to the computer-executable code operable on a computer to perform a storage function that manages data access and may provide data access semantics of a general purpose operating system. The storage operating system can also be a microkernel, an application program operating over a general-purpose operating system, such as UNIX® or Windows®, or as a general-purpose operating system with configurable functionality, which is configured for storage applications as described herein.

In addition, it will be understood to those skilled in the art that the features described herein may apply to any type of special-purpose (e.g., file server or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the disclosure may be utilized with any suitable file system, including conventional write-in-place file systems.

Figure 5:
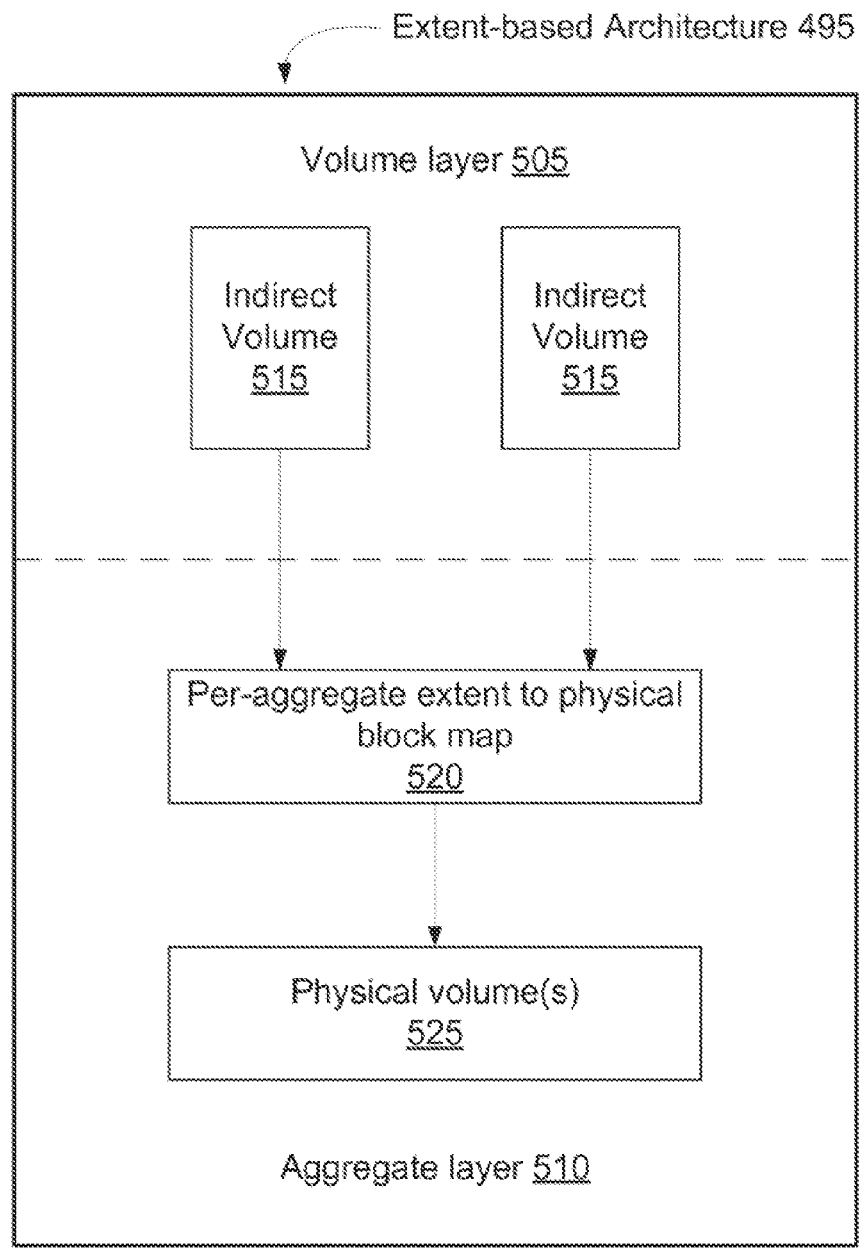
FIG. 5 illustrates an example block diagram of an extent-based storage architecture.

FIG. 5 illustrates an example block diagram of an extent-based storage architecture 495. The extent-based architecture 495 includes a volume layer 505 and an aggregate or region manager layer 510. The volume layer 505 includes one or more indirect volumes 515 to indirectly map an I/O request from a client 202 to one or more physical blocks within the storage disks 271. For one aspect, the storage server 210 uses one entry in the indirect volumes 515 for each extent, as opposed to examples that used one indirect volume entry (e.g., in a flexible volume 110) for each data block. For one aspect, the I/O request references data by way of a file block number (FBN). An FBN refers a data block in a volume 515 as referenced by a client 202. The storage server 210 uses the FBN as a key to access an extent identifier. An extent refers to a contiguous group of one or more data blocks in FBN space. The aggregate layer 510 includes an extent-to-physical block map 520 and one or more physical volumes 525. The extent-to-physical block map 520 maps an extent identifier (e.g., accessed by way of an FBN in the volume layer 505) to a pointer to another extent or to one or more physical volume block numbers (PVBN) in the physical volume 525.

The extent-based entries of the extent-to-physical block map 520 provide per-aggregate indirection. In contrast, virtual volume block numbers (VVBN) of volume containers 120 provide per-volume indirection. A per-aggregate extent-based entry, as used herein, refers to an extent being unique across volume boundaries within an aggregate. A per-volume indirect entry refers to an entry being unique within volume boundaries. For per-aggregate indirection, when the storage server 210 copies, moves, or makes other changes to physical blocks, the changes are reflected within the aggregate layer 510 in the extent-to-physical block map 520. These changes, however, do not need to be propagated into the volume layer 505 because the extent identifier does not need to change. This enables compression, decompression, sharing, and the termination of sharing of extents to occur without communication with the volume layer 505. Blocks can be easily shared across volume boundaries, enabling cross-volume deduplication. Segment cleaning and related disk gardening techniques can be performed on the extent-to-physical block map 520 in a single pass, all without having to propagate changes up into the volume layer 505.

Figure 6:
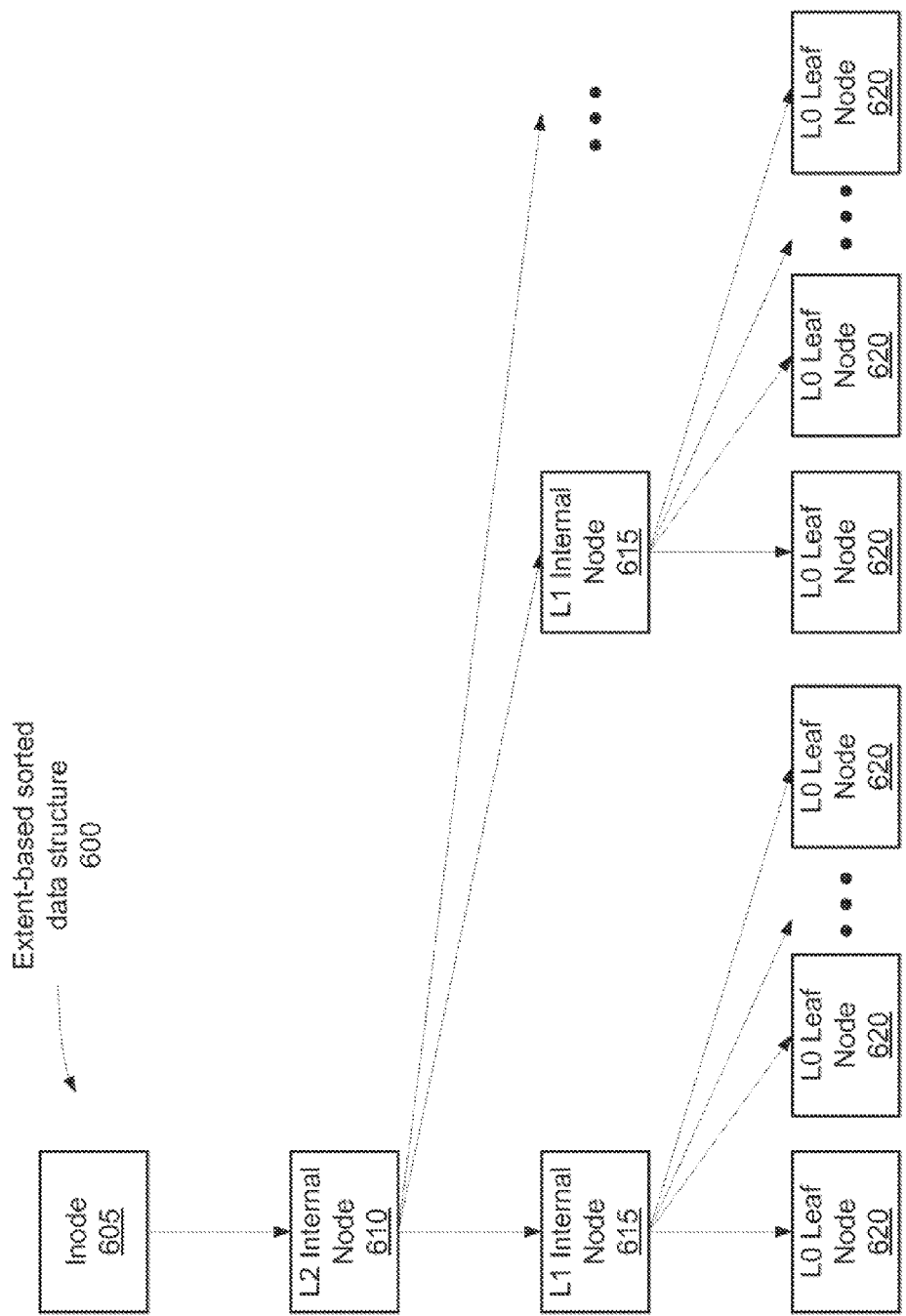
FIG. 6 illustrates an example extent-based sorted data structure within an extent-based storage architecture.

FIG. 6 shows an example extent-based sorted data structure 600 within an extent-based storage architecture. For one aspect, the extent-based sorted data structure is a B+ tree. Alternatively, the extent-based sorted data structure 600 is another type of tree or sorted data structure that is able to perform lookup and modify operations in, at most, O(log n) time, where n is the number of data blocks in a file. An inode 605 points to the root of the extent-based tree/sorted data structure 600 and contains volume/file metadata and pointers to data blocks 620 or indirect blocks 610/615. For example, in a B+ tree, indirect blocks are referred to as internal nodes 610/615 and data blocks are referred to as leaf nodes 620. For one aspect, the inode 605 points to one or more branches of internal nodes 610/615. For an alternate aspect, the inode 605 points directly to the leaf nodes 620. For one aspect, the internal nodes 610/615 store pointers to other nodes but do not store data, e.g. data such as an FBN, extent identifier, PVBN, etc. The leaf nodes 620, on the other hand, store data, e.g. data such as an FBN, extent identifier, PVBN, etc.

For one aspect, the lengths of extents vary. For one aspect the length of an extent is expressed as the number of data blocks of a fixed size within the extent. For example, an extent containing only a single 4 KB block would have a length of 1, an extent containing two 4 KB blocks would have a length of 2, etc. For one aspect, extents have a maximum length driven by user I/O or write allocation (e.g., extents having a maximum length of 64 blocks). For an alternate aspect, the length of extents may be consistently defined (e.g., 8 blocks).

For an example utilizing an extent-based tree 600 with variable-length extents, the height of the tree is variable, even between two files of the same size. For one aspect, the span of an internal node 610/615 is also variable. As used herein, the span of an indirect block refers to the number of blocks to which that indirect block refers. As a comparison, in examples of WAFL, the span of an indirect block is fixed: the span of a tradvol indirect block is 1024 blocks, the span of a flexvol indirect block is 510 blocks (e.g., as stored in flexible volume 110), and the span of a 64-bit flexvol indirect block is 255 blocks (e.g., as stored in flexible volume 110).

Additionally, in examples of WAFL, a contiguous extent containing N blocks would use the same amount of indirect space as N randomly located blocks because each data block of the extent would be represented by a separate indirect entry in the volume layer. An extent-based sorted data structure 600, however, greatly reduces the amount of indirect space used because volume layer entries are per-extent rather than per-block. For example, consider a 64-bit flexvol storing a file containing 532,685,800 bytes of data (approximately 508 MB) as provided in examples of WAFL. The flexvol includes indirect blocks having 255 entries (a span of 255) and each entry refers to a 4 KB block. The flexvol represents the 508 MB file using two level-2 indirect blocks pointing to 510 level 1 indirect blocks pointing to 130050 4 KB level 0 data blocks. In an extent-based sorted data structure 600, instead of using one entry for each 4 KB block, the storage server 210 uses one entry for each extent. Extents can be longer than a single 4 KB block. For example, an extent is a contiguous group of one or more 4

KB blocks. Using an extent-based sorted data structure 600 with 16 block long extents and 127 entries per block, the storage server 210 represents the 130050 4 KB with only 8129 leaf nodes 620 and 65 internal nodes 610/615, resulting in an 87% savings in indirect block metadata.

Figure 7:
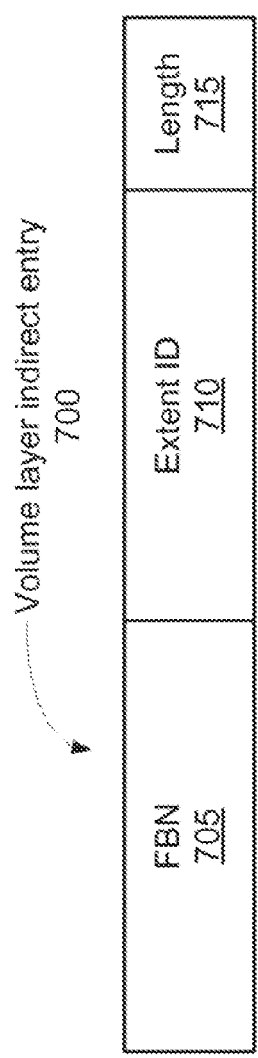
FIG. 7 illustrates an example volume layer indirect entry for a leaf node of the extent-based data structure of FIG. 6.

For one aspect, the storage server 210 uses an extent-based sorted data structure 600 to provide an indirect volume 515. For one aspect, the storage server 210 provides each indirect volume 515 as a B+ tree. FIG. 7 shows an example volume layer indirect entry 700 for a leaf node 620 of an extent-based data structure 600 used to provide an indirect volume 515. The volume layer indirect entry 700 stores an FBN 705, a corresponding extent identifier 710, and a length of the extent 715. The storage server 210 uses the FBN 705 as the primary sorting key to navigate the extent-based sorted data structure 600 and find the extent identifier 710 that corresponds to the FBN 705. For one aspect, the FBN 705 is 48 bits, the extent identifier 710 is 48 bits, and the length 715 is 8 bits. Alternatively, the storage server 210 uses different sizes for one or more of the FBN 705, extent identifier 710, or length 715. For example, the extent identifier 710 may be 64 bits long in an alternate aspect (e.g., to provide for 512 byte granularity in the offset of blocks). For one aspect, extent lengths 715 vary. For an alternate aspect, extent lengths 715 are fixed.

For one aspect, the FBN 705 is 51 bits to provide for 512 byte granularity in the offsets of blocks (where a 48 bit FBN 705 provides for 4 KB byte granularity of FBN offsets). Because the storage server 210 stores indirect blocks using an extent-based sorted data structure 600, FBN's do not need to be aligned based upon block size (e.g., 512 byte offset alignment and 4 KB blocks). The extent-based sorted data structure 600 stores an entry for an entire extent based upon an FBN and length of the extent. The extent-based sorted data structure 600 does not store only the block at that FBN and then require subsequent entries to correspond to each subsequent FBN. For example, given two adjoining extents that are each 16 blocks in length, the entries in the extent-based sorted data structure 600 for these two extents will have FBN's that are offset by at least 16 blocks. In traversing the extent-based sorted data structure 600, the storage server 210 does not need to assume that each entry is separated by the same offset or that an entry's FBN is offset by a whole number multiple of the block size. Additionally, the savings in indirect metadata resulting from using an extent-based sorted data structure 600 compensates for the use of three additional bits for each FBN 705. Providing the 512 byte offset granularity within the volume layer eliminates the previously described complications resulting from misalignment between blocks in FBN space and blocks in aggregate space. Once an FBN is mapped to an extent identifier 710, the extent identifier can be mapped to an extent (as described below) without concern of misalignment because the aggregate layer maintains a consistent block-sized alignment of offsets within the aggregate.

The storage server 210 allocates extent identifiers 710 during write allocation. For one aspect, the storage server 210 allocates extent identifiers 710 from a finite pool. Alternatively, extent identifiers 710 are monotonically increasing values that never wrap.

Figure 8:
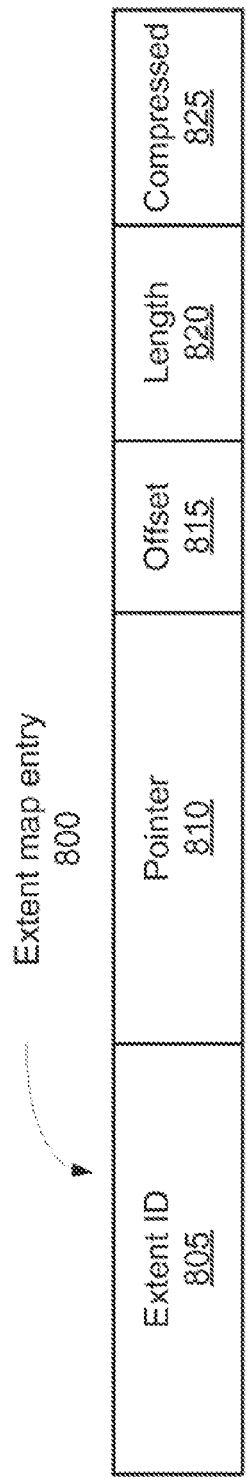
FIG. 8 illustrates an example extent map entry for a leaf node of the extent-based data structure of FIG. 6.

For one aspect, the length 715 of an extent is used for a consistency check as described with reference to FIG. 8 below.

The per-volume container files 120 of examples of WAFL are not used in an extent-based sorted data structure 600 used to provide an indirect volume 515. Instead of per-volume container files 120, the storage server 210 uses an extent-to-physical block map. As described above, the use of the extent-to-physical block map can result in reduced indirect metadata. The indirect volume blocks, however, no longer contain cached pointers to PVBN's. Accesses to an extent involves the storage server 210 looking up an extent identifier 710 in the indirect volume 515 and looking up the PVBN (e.g., by way of a pointer) in the extent-to-physical block map 520. The computational overhead of this additional I/O look-up is offset by some of the features of extent-based architecture 495. For example, I/O accesses are per extent rather than per block and, therefore, multiple blocks are accessed by a single I/O access of each the indirect volume 515 and the extent-to-physical block map 520. Additionally, the extent-based architecture 495 gains advantages in compression, deduplication, segment cleaning, etc., which can be performed with altering the extent identifier 710. Actions such as deduplication can easily span the aggregate rather than just a single volume and many changes to blocks, e.g., resulting from compression and segment cleaning, do not need to be propagated up to the indirect volume 515 (e.g., to correct cached indirect pointers as in examples of WAFL).

For one aspect, the storage server 210 uses an extent-based sorted data structure 600 to provide an extent-to-physical block map 520. For one aspect, the storage server 210 provides an extent-to-physical block map 520 as a B+ tree. FIG. 8 shows an example extent map entry 800 for a leaf node 620 of an extent-based sorted data structure 600 used to provide an extent-to-physical block map 520. Leaf nodes 620 of an extent-based sorted data structure 600 used to provide an extent-to-physical block map 520 store extent identifiers 805, references 810 such as a pointers to PVBN's or other extent identifiers, offsets for the extents 815, lengths for the extents 820, and compressed bits 825 indicating whether the extent is compressed. As used herein, an offset for an extent is a distance in blocks from the first block of the contiguous group of blocks that make up an extent. For one aspect, the extent identifier 805 is 48 bits, the pointer/extent identifier 810 is 48 bits, the offset 815 is 8 bits, the length 820 is 8 bits, and the compressed bit 825 is 1 bit. For an alternate aspect, different numbers of bits are used for each portion of an extent map entry 800.

For one aspect, each extent map entry 800 includes either a pointer or other reference 810 directly to a PVBN or to another extent identifier 805 that directly references a PVBN. For one aspect, each PVBN is owned by only one extent and any other extent that references the PVBN does so by way of referencing the owner extent. As a result, the maximum additional look-up for a given extent to get to a PVBN should be no more than one. This maximum prevents the level of indirect references in extent map entries 800 from becoming arbitrarily deep and taking an arbitrary amount of time (as measured in terms of disk I/O operations, assuming that each extent entry is likely to be stored within a different disk block). As a result of extents having a single owner, the storage server 210 can use the owner extent identifier as a tag, unique number, or other context for the purpose of lost write detection.

For an alternate aspect, all extent identifiers 805 map directly to a PVBN and PVBN's can be owned by more than one extent. For a feature including lost write detection, the storage server 210 creates a context, tag, or unique number, e.g., via a separate table, that is separate/different from the extent identifiers 805 due to the possibility of multiple extent identifiers referencing a single PVBN.

For one aspect, the storage server 210 checks data consistency by comparing the length 715 of an extent as stored in the volume layer 505 with the length 820 of the extent as stored in the aggregate layer 510.

For one aspect, the storage server 210 utilizes a finite number of extent identifiers. If an extent identifier is a candidate to be reused, e.g., upon a request to delete the extent, the storage server 210 first determines whether or not other extents refer to that extent identifier. If one or more extents reference the candidate extent identifier, the storage server 210 ensures that the one or more extents continue to point to the same data (e.g., by altering one of the extents to directly reference the corresponding PVBN and the other extents to reference that altered extent). For one aspect, the storage server 210 maintains, e.g., in one or more metafiles, reference counts for references by extents to each extent and by extents to each PVBN. Reference counts enable the storage server 210 to be aware of whether or not other extents would be affected by operations performed on an extent/PVBN (e.g., reallocation, segment cleaning, etc.). The storage server 210 tracks increments and decrements of the reference count in one or more log files. For example, the storage server 210 would increment a reference count when a new extent/PVBN is allocated, when an extent identifier is shared (e.g., via clone creation, snapshot creation, or deduplication, etc.). For one aspect, the storage server 210 accumulates increments and decrements using a log file and makes batch updates to reference count metafiles, e.g., at a consistency point. For one aspect, the storage server 210 increments a reference count from 0 to 1 for a PVBN directly (bypassing the log file) when allocating a new extent/PVBN and executes all other increments and decrements of the reference counts via the respective reference count log file.

Figure 9:
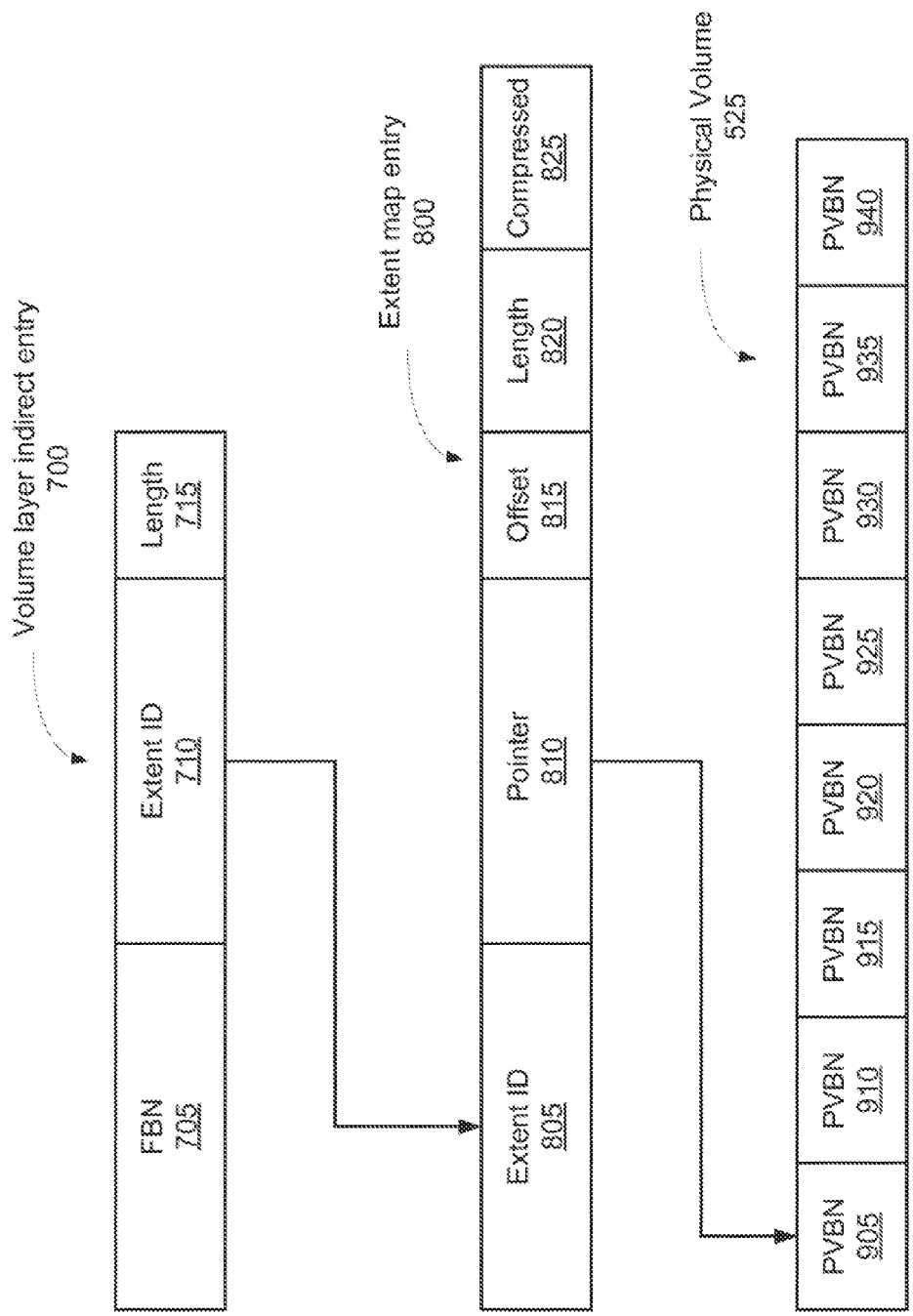
FIG. 9 illustrates an example sequence of look ups in the volume layer and aggregate layer of an extent-based storage architecture to map an FBN to a PVBN.

FIG. 9 shows an example sequence of look ups in the volume layer 505 and aggregate layer 510 to map an FBN to a PVBN in the physical volume 525. For example, when the storage server 210 receives an I/O request including an FBN 705, the storage server 210 uses the FBN as a key in an indirect volume 515 to look up an extent identifier 710 in a volume layer indirect entry 700. The storage server 210 uses the extent identifier 710 as a key to look up an extent map entry 800 in an extent-to-physical block map 520. The storage server 210 uses the pointer 810 to access PVBN 905 in the physical volume 525. In this example, the offset 815 is zero. If the offset was a positive value, the storage server 210 would access one or more blocks subsequent to PVBN 905 (e.g., PVBN 910, PVBN 915, etc.). If the length 820 is greater than 1, the storage server 210 would access PVBN 905 and one or more subsequent blocks (e.g., PVBN 910, PVBN 915, etc.).

Figure 10:
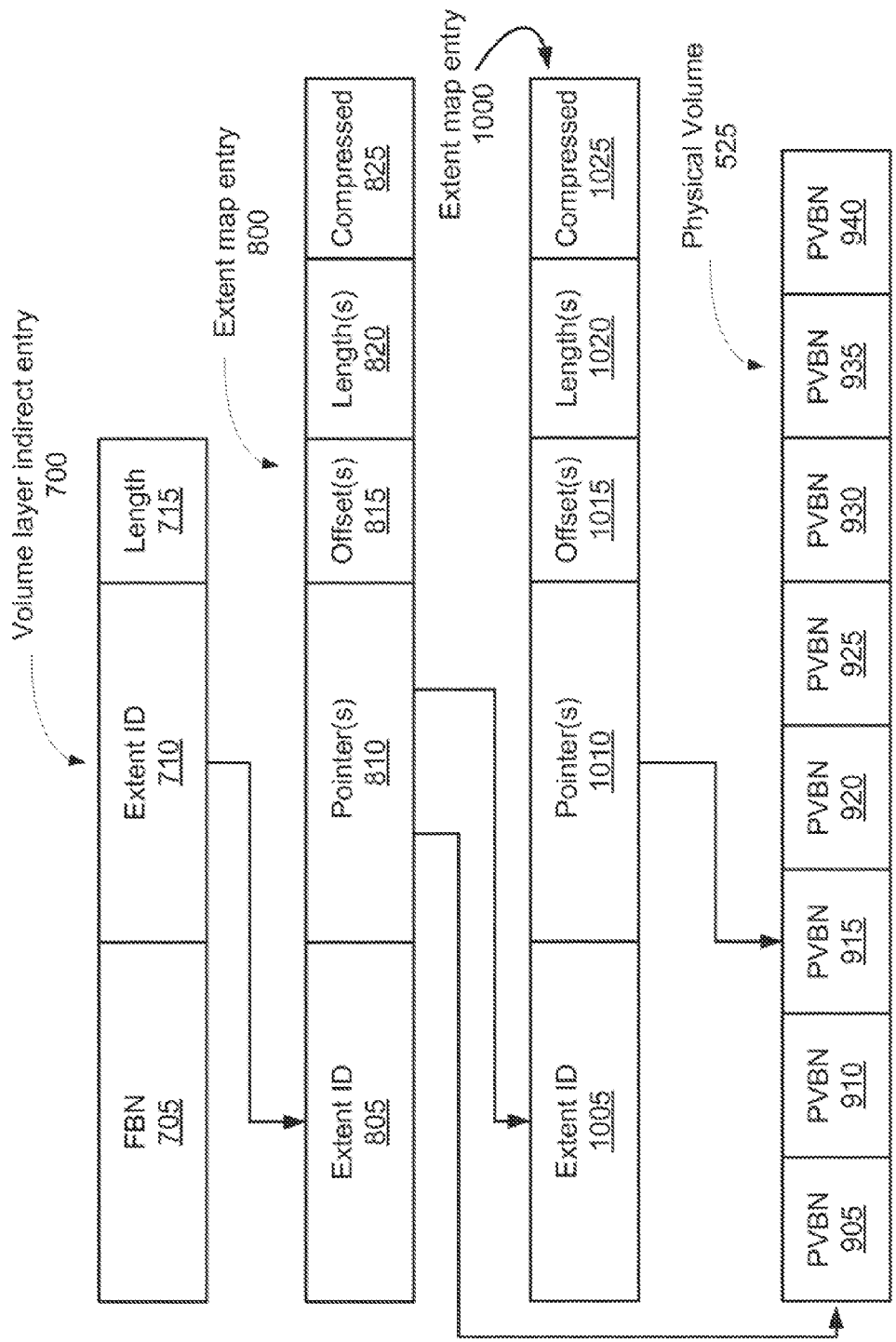
FIG. 10 illustrates another example sequence of look ups in the volume layer and aggregate layer of an extent-based storage architecture to map an FBN to a PVBN.

FIG. 10 shows another example sequence of look ups in the volume layer 505 and aggregate layer 510 to map an FBN to a PVBN in the physical volume 525. Similar to the example described with reference to FIG. 9, the storage server 210 receives an I/O request including an FBN 705 and uses the FBN as a key in an indirect volume 515 to look up an extent identifier 710 in a volume layer indirect entry 700. The storage server 210 uses the extent identifier 710 as a key to look up a first extent map entry 800 in an extent-to-physical block map 520. In this example, the extent identifier 805 is associated with pointer 810 to a PVBN 905 and a pointer or extent identifier 810 to a second extent map entry 1000. For one aspect, the first extent has multiple extent map entries 800, one for each pointer or reference 810. For example, each entry 800 would include the same extent identifier 805, but different combinations of pointer 810, offset 815, length 820, and compressed 825. For the sake of simplicity, FIG. 10 illustrates a single extent map entry that includes multiple pointers 810, offsets 815, lengths 820, and compressed bits 825. The storage server 210 uses the pointer 810 to access PVBN 905 in the physical volume 525. The storage server 210 uses the extent identifier 810 to look up the second extent map entry 1000 in the extent-to-physical block map 520. The storage server 210 uses the pointer 1010 to access PVBN 915 in the physical volume 525.

Figure 11:
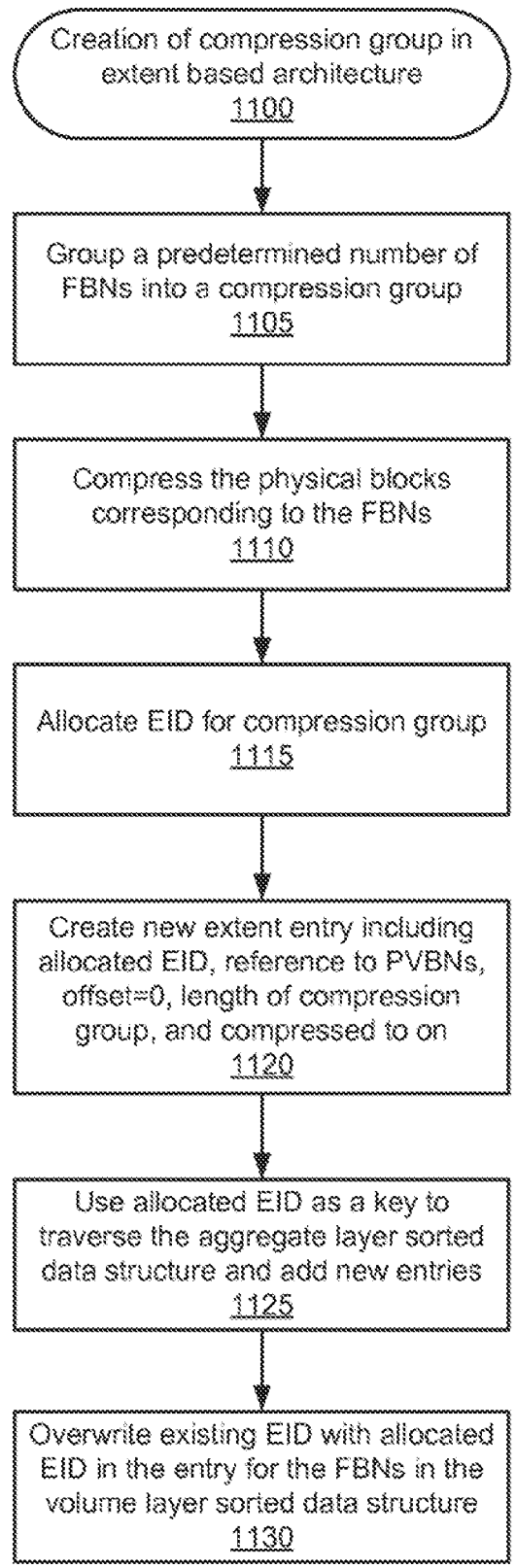
FIG. 11 is an example method of creating a compression group in an extent-based architecture.

FIG. 11 is an example method 1100 of creating a compression group in an extent-based architecture. The method 1100 may be performed by processing logic that comprises hardware (e.g., circuitry, dedicated logic, programmable logic, microcode, etc.), software (e.g., instructions run on a processing device to perform hardware simulation), or a combination thereof, represented by processing instruction blocks 1105-1130 in FIG. 11. In certain aspects, method 1100 may be performed by partial overwrite module 498 of FIG. 4 or extent-based architecture 495 of FIG. 4.

At block 1105, the storage server 210 groups a predetermined number of FBNs into a compression group. In one aspect, the predetermined number of FBNs is 8 FBNs. At processing instruction block 1110, the storage server 210 compresses the physical blocks corresponding to the FBNs in the compression group. The compression is performed by one or more methods commonly known in the art. For example, methods such as Huffman encoding, Lempel-Ziv methods, Lempel-Ziv-Welch methods, algorithms based on the Burrows-Wheeler transform, arithmetic coding, etc. At processing instruction block 1115, the storage server 210 allocates an extent identifier 805 for the compression group. At processing instruction block 1120, the storage server creates a new extent map entry 800 including the newly allocated extent identifier 805, a reference 810 to the stored data blocks in the compression group, an offset 815 from the reference 810 where the compression group begins, the length 820 in blocks of the compression group, and the compressed bit set to on.

At processing instruction block 1125, the storage server 210 uses the allocated extent identifier 805 as a key to traverse the aggregate layer extent-based sorted data structure 600 and adds new extent map entry 800 for the compression group. At processing instruction block 1130, the storage server 210 overwrites the existing extent identifier 710 with the allocated extent identifier 805 in the existing entry 700 in the volume layer extent-based sorted data structure 600 associated with the compression group.

Figure 12:
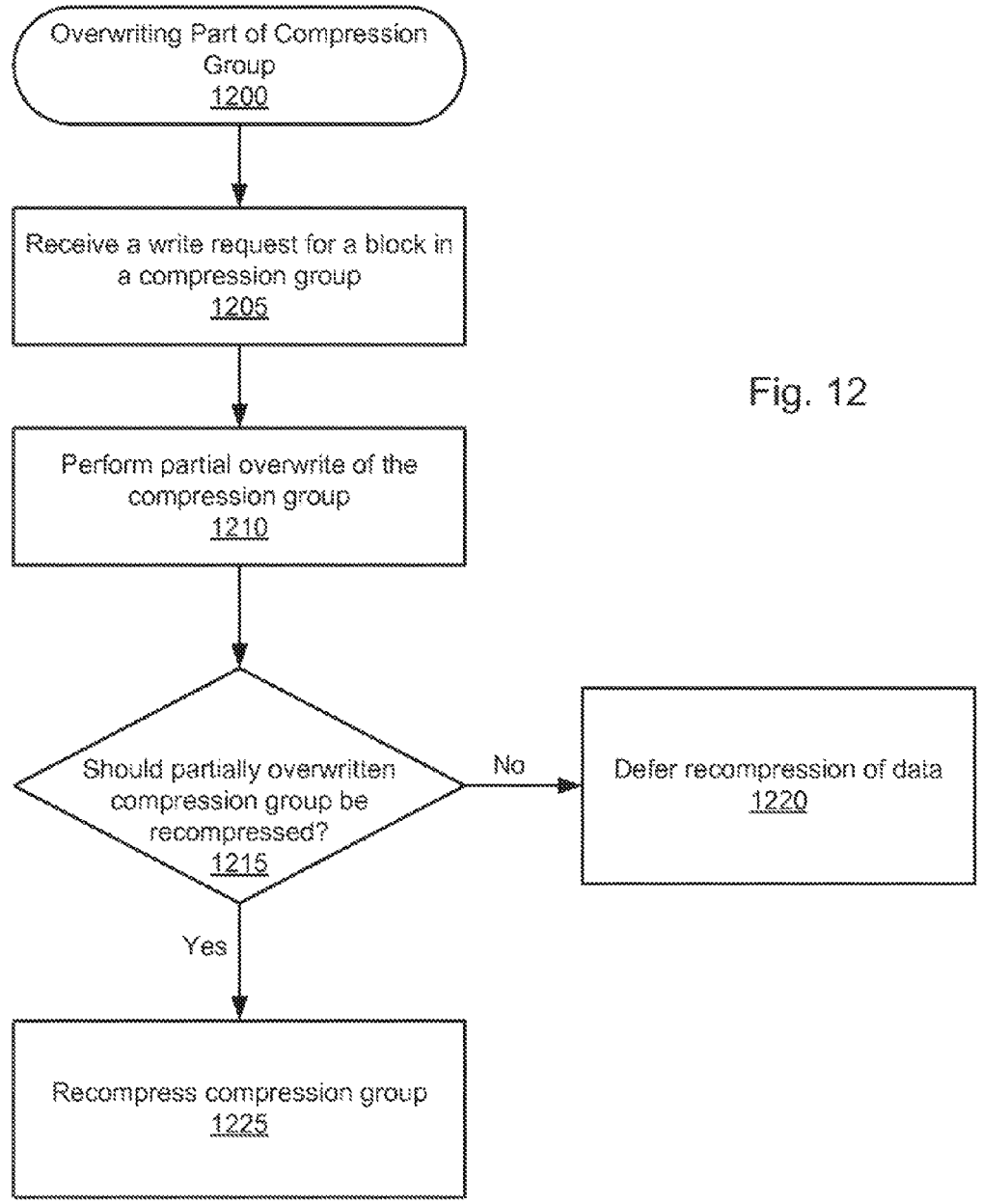
FIG. 12 is an example method of overwriting part of a compression group.

FIG. 12 is an example method 1200 of overwriting part of a compression group in an extent-based architecture. The method 1200 may be performed by processing logic that comprises hardware (e.g., circuitry, dedicated logic, programmable logic, microcode, etc.), software (e.g., instructions run on a processing device to perform hardware simulation), or a combination thereof, represented by processing instruction blocks 1205-1225 in FIG. 12. In certain aspects, method 1200 may be performed by partial overwrite module 498 of FIG. 4.

At processing instruction block 1205, the storage server 210 receives a write request including an FBN and one or more data blocks in a compression group to be overwritten from a client 202. For one aspect, the client 202 provides the data to be written. Alternatively, the client 202 provides a reference to the data to be written. At processing instruction block 1210, the storage server 210 partially overwrites the compression group without uncompressing the compression group. At processing instruction block 1215, the storage server 210 determines if the partially overwritten compression group should be recompressed. If the storage server 210 determines that the partially overwritten compression group should not be recompressed, the recompression of the compression group is deferred at processing instruction block 1220. If the storage server 210 determines that the partially overwritten compression group should be recompressed, the compression group is recompressed at processing instruction block 1225. The compression is performed by one or more methods commonly known in the art. In one aspect, the storage server 210 returns an indication to the client 202 that the overwrite request for the compression group was successfully processed.

Figure 13:
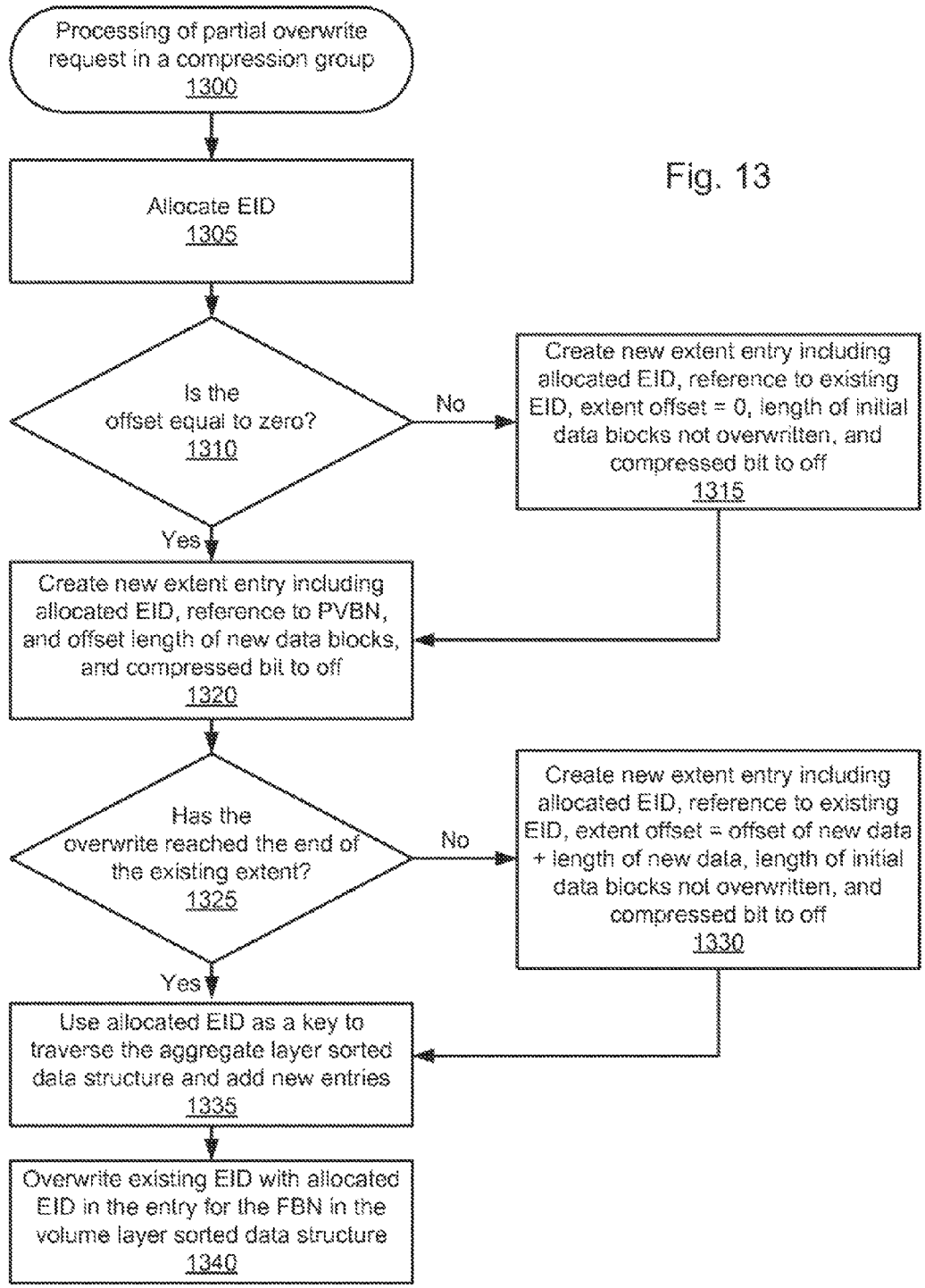
FIG. 13 is an example method of processing a partial overwrite request in a compression group.

FIG. 13 is an example method 1300 of processing a partial overwrite request in a compression group in an extent-based architecture. The method 1300 may be performed by processing logic that comprises hardware (e.g., circuitry, dedicated logic, programmable logic, microcode, etc.), software (e.g., instructions run on a processing device to perform hardware simulation), or a combination thereof, represented by processing instruction blocks 1305-1320 in FIG. 13. In certain features, method 1300 may be performed by partial overwrite module 498 of FIG. 4.

At processing instruction block 1305, the method allocates an extent identifier 805 for a partial extent to be written. At processing instruction block 1310, the method determines if the offset between the FBN provided with the write request and the FBN 705 for the overlapping extent is zero. At processing instruction block 1315, if there is a non-zero offset, the method creates a new extent map entry 800 including the newly allocated extent identifier 805, a reference 810 to the existing extent identifier equal to zero, a length 820 of the existing data blocks that are not being overwritten (e.g., the value of the offset between the FBN provided with the write request and the FBN 705 for the existing extent), and the compressed bit to off. The compressed bit is set to off because, although the compression group is still compressed, the newly store data blocks corresponding to the partially overwritten compression group are not compressed. The newly stored data block may be later compressed as described below with reference to FIG. 14.

At processing instruction block 1320, if the offset of the FBN provided with the write request from the FBN 705 for the overlapping extent is zero or after creating a new extent map entry 800 for an initial set of blocks not being overwritten, the method creates a new extent map entry 800 including the newly allocated extent identifier 805, a reference 810 to the stored data blocks provided with the overwrite request, an offset 815 from the reference 810 where the newly stored data blocks begin, the length 820 in blocks of the new data, and the compressed bit to off.

At processing instruction block 1325, the method determines if the overwrite process has reached the end of the existing extent. For one aspect, the method determines if the sum of the offset from the start of the existing extent for the new data blocks and the length of the new data blocks is greater or equal to length of the existing extent to determine if the end of the existing extent has been reached after completing the overwrite portion of the method 1300.

At processing instruction block 1330, if the overwrite has not reached the end of the existing extent, the method creates a new extent map entry 800 including the newly allocated extent identifier 805, a reference 810 to the existing extent identifier, an offset 815 equal to the first block of the remainder of existing blocks that are not being overwritten (the offset from the beginning of the existing extent to the first block to be overwritten+the length of the new data), a length 820 of the remainder of the existing data blocks that are not being overwritten, and the compressed bit to off.

At processing instruction block 1335, the method uses the allocated extent identifier 805 as a key to traverse the aggregate layer extent-based sorted data structure 600 and adds the one or more new extent map entries 800. At processing block 1340, the method overwrites the existing extent identifier 710 with the allocated extent identifier 805 in the existing entry 700 in the volume layer extent-based sorted data structure 600 associated with the FBN 705 for the overlapping extent.

Therefore, the data blocks of the existing extent (corresponding to the original compression group) do not need to be read and uncompressed prior to performing the partial overwrite of the compression group because the compression group itself is not overwritten. For one aspect, if an extent map entry 800 refers to the existing extent map entry 800 for the compression group, that extent remains unchanged by the partial overwrite because the existing extent still refers to the original compression group and includes the original offset, length for the compression group, and compressed bit set to on. A new extent map entry is created by the partial overwrite of the compression group including a reference to the newly stored blocks, the length for the newly stored blocks, and compressed bit set to off because those newly stored blocks are not compressed.

Figure 14:
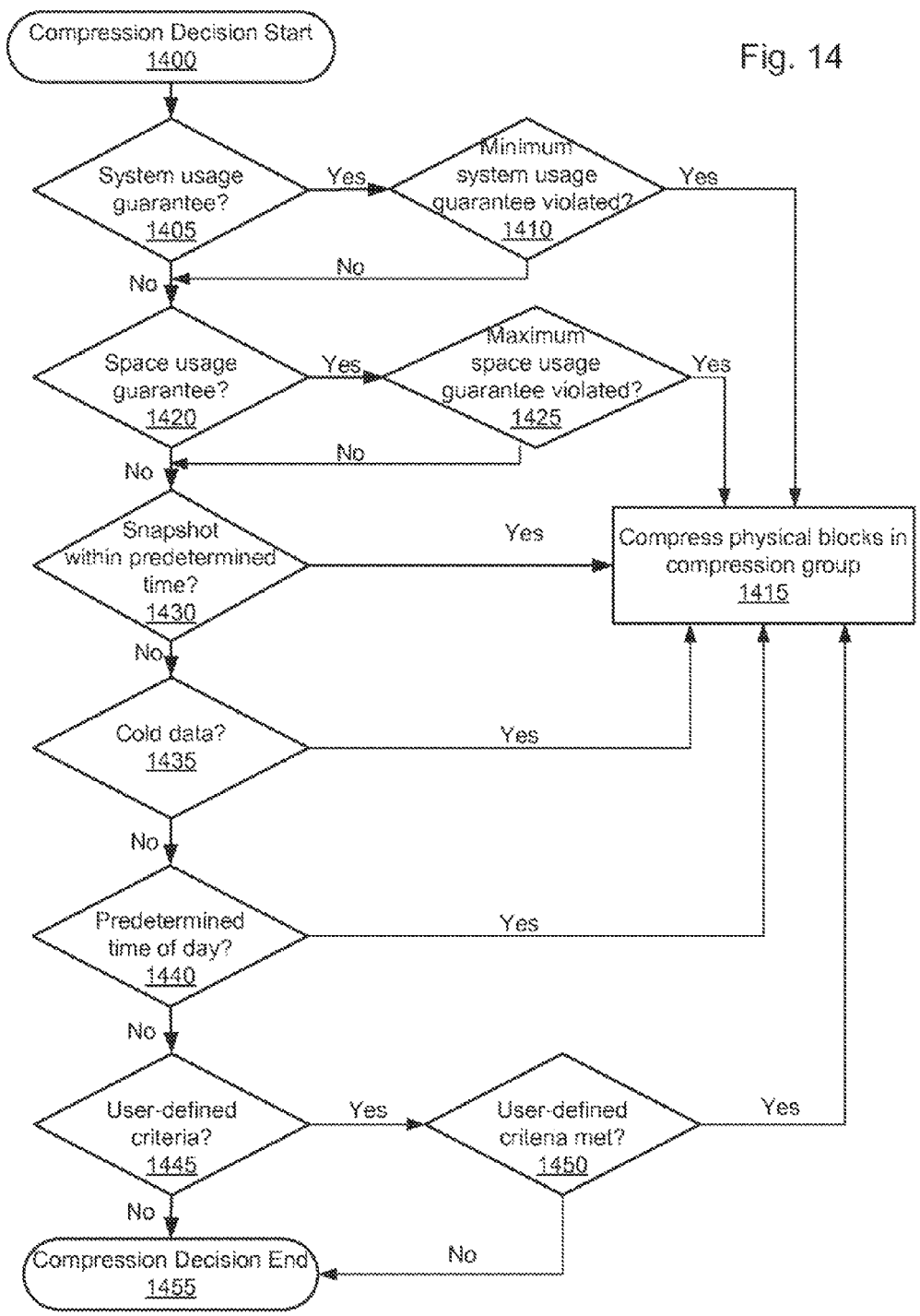
FIG. 14 is an example method of a compression decision.

FIG. 14 is an example method 1400 for a compression decision making process. The method 1400 may be performed by processing logic that comprises hardware (e.g., circuitry, dedicated logic, programmable logic, microcode, etc.), software (e.g., instructions run on a processing device to perform hardware simulation), or a combination thereof, represented by processing instruction blocks 1405-1450 in FIG. 14. In certain aspects, method 1400 may be performed by partial overwrite module 498 of FIG. 4.

At block 1405, the method determines if the storage server 210 has a system usage guarantee. In one aspect, a system usage guarantee is a policy that includes a minimum system usage to guarantee that the usage of the central processing unit (CPU) in the storage server 210 will always be above a predetermined percentage (e.g., above 20%). This minimum system usage guarantee guarantees that the CPU is always being utilized rather than sitting idle. If the minimum system usage guarantee is being violated at processing instruction block 1410, the storage server 210 is not being utilized efficiently, and therefore the storage server 210 has bandwidth to perform tasks, such as compression. Therefore, the physical blocks in the compression group are compressed at processing instruction block 1415 using one or more methods commonly known in the art. In some aspects, the system usage guarantee guarantees that the usage of the CPU in the storage server 210 will always be below a predetermined percentage (e.g., below 70%). This guarantees that the CPU is not being over-utilized. If the maximum system usage guarantee is violated, the physical blocks in the compression group will not be compressed because the CPU usage is already above the predetermined threshold.

If there is no system usage guarantee for the storage sever 210 at processing instruction block 1405 or the minimum system usage guarantee is not violated at processing instruction block 1410, the method determines if the storage server 210 has a space usage guarantee at processing instruction block 1420. In one aspect, a space usage guarantee is a policy that includes a maximum space usage to guarantee that the usage of the storage devices (e.g., disks 271) accessible to the storage server 210 is not above a certain percentage (e.g., disks are not more than 70% full). If this maximum space usage guarantee is being violated at processing instruction block 1425, the space usage of the storage server 210 is too high, and the data in the storage devices must be compressed. Therefore, the physical blocks in the compression group are compressed at processing instruction block 1415 using one or more compression methods commonly known in the art. In some aspects, the space usage guarantee includes a minimum space usage. If the space usage guarantee includes a minimum space usage, the physical blocks in the compression group will not be compressed if the minimum space usage is met. This will avoid the storage server 210 being utilized for compression when the space usage is minimal in the storage server 210.

If there is no space usage guarantee for the storage sever 210 at processing instruction block 1405 or the space usage guarantee is not violated at processing instruction block 1410, the method determines if the storage server 210 is to perform a snapshot of data within a predetermined amount of time at processing instruction block 1430. Prior to a snapshot being performed, it is beneficial to compress the data that will be used in the snapshot such that the snapshot takes less space once it is taken. If the snapshot is to be performed within the predetermined amount of time (e.g., 1 hour), the method compresses the physical blocks in the compression group at processing instruction block 1415 using one or more compression methods commonly known in the art. A storage server generally performs different types of snapshots, such as an hourly snapshot, a daily snapshot, a weekly snapshot, and a monthly snapshot. In some aspects, the method may further determine the type of snapshot that is to be taken within a predetermined amount of time, and may only compress the physical blocks if the snapshot is a certain type of snapshot (e.g., daily snapshot, a weekly snapshot, and a monthly snapshot).

If there is no snapshot within a predetermined amount of time at processing instruction block 1430, the method determines if the data in the compression group is cold data at processing instruction block 1435. Cold data is data that is not overwritten often, such as log files. In contrast, hot data is data that is overwritten often, such as a file that is currently open and being modified by a user. The data in the compression group is found to be cold data by determining the last created time, the last modified time, and/or the last accessed time of the data. The last created time is the last time the data was created. The last modified time is the last time the data was modified. The last accessed time is the last time the data was accessed. If the determined time is more than a predetermined time period in the past (e.g., 1 day), then the data is determined to be cold data. The determined time is compared to the current time of the system to determine if the determined time is more than the predetermined time period in the past. In some aspects, the last created time, the last modified time, and/or the last accessed time are extracted from metadata of the data blocks in the compression group. The current time of the system is determined by accessing a clock associated with the system. If the data is cold data, the method compresses the physical blocks in the compression group at processing instruction block 1415 using one or more compression methods commonly known in the art.

If the data is not cold data at processing instruction block 1435, the method determines if it is a predetermined time of day at processing instruction block 1440. The time of day is determined by checking a system clock in the storage server 210. The compression may be performed at the same time every day (e.g., midnight). If it is the predetermined time of day, the method compresses the physical blocks in the compression group at processing instruction block 1415 using one or more compression methods commonly known in the art.

If it is not a predetermined time of day, the method determines if user defined criteria exists for compression in the storage server 210 at processing instruction block 1445. The user-defined criteria allow a user to define when compression should be triggered in the storage server 210. For example, the user can specify that certain files should be selected more often for compression (e.g., word processing files). In some aspects, a user may enter criteria for compression using a graphical user interface (GUI).

If there are no user-defined criteria, the method ends at processing instruction block 1455. If there are user-defined criteria, the method determines if the user-defined criteria has been met at block processing instruction 1450. If the user-defined criteria are met at processing instruction block 1450, the method compresses the physical blocks in the compression group at processing instruction block 1415 using one or more compression methods commonly known in the art. If the user-defined criteria are not met at processing instruction block 1450, the method ends at processing instruction block 1455.

Thus, an extent-based architecture can be included in a computer system as described herein. The methods 1100, 1200, 1300, and 1400 may constitute one or more programs made up of computer-executable instructions. The computer-executable instructions may be written in a computer programming language, e.g., software, or may be embodied in firmware logic or in hardware circuitry. The computer-executable instructions to provide a persistent cache may be stored on a machine-readable storage medium. A "computer-readable storage medium," or a "non-transitory computer-readable storage medium," as the terms are used herein, include any mechanism that provides (i.e., stores and/or transmits) information in a form accessible by a machine (e.g., a computer, network device, personal digital assistant (PDA), manufacturing tool, any device with a set of one or more processors, etc.). A "non-transitory computer-readable storage medium," as the term is used herein, does not include a signal, carrier wave, etc. The term RAM as used herein is intended to encompass all volatile storage media, such as dynamic random access memory (DRAM) and static RAM (SRAM). Computer-executable instructions can be stored on non-volatile storage devices, such as magnetic hard disk, an optical disk, and are typically written, by a direct memory access process, into RAM/memory during execution of software by a processor. One of skill in the art will immediately recognize that the terms "machine-readable storage medium" and "computer-readable storage medium" include any type of volatile or non-volatile storage device that is accessible by a processor. For example, a machine-readable storage medium includes recordable/non-recordable media (e.g., read-only memory (ROM); random access memory (RAM); magnetic disk storage media; optical storage media; flash memory devices; etc.).

Although the disclosure has been described with reference to specific examples, it will be recognized that other examples are possible and can be practiced with modification and alteration within the spirit and scope of the appended claims. Accordingly, the specification and drawings are to be regarded in an illustrative sense rather than a restrictive sense.

What is claimed is:

1. A method comprising:
in response to receiving a write request that indicates a first file block identifier and indicates data to be written, determining that the first file block identifier resolves to a data block in a compression group, the compression group comprising a group of data blocks that is compressed; and
partially overwriting the compression group while the compression group remains compressed, wherein the partial overwriting comprises,
storing the data of the write request as uncompressed data outside the compression group, and
updating references used for resolving file block identifiers of the file to data blocks of the file, wherein the updating comprises updating the references to map the first file block identifier to the compression group and to the uncompressed data;
determining whether a predetermined criteria is violated by the partial overwriting of the compression group, wherein the predetermined criteria is selected from a group consisting of a system usage guarantee, a space usage guarantee, and a user-defined criteria; and
in response to determining that the predetermined criteria is violated, compressing the partially overwritten compression group.

2. The method of claim 1, wherein updating the references comprises adding an indirection reference to an indirection block of the file, wherein the indirection block includes a first reference to the data blocks of the compression group and the added reference references the uncompressed data.

3. The method of claim 1, wherein partially overwriting comprises:
allocating an extent identifier;
determining an offset into an existing extent associated with the compression group, the offset comprising a difference between a first block number provided in the write request and a second block number for a start of the existing extent, wherein the first file block identifier is the first block number; and
in response to determining that the offset is non-zero,
generating a first extent entry having the allocated extent identifier and a reference to a start of the compression group,
generating a second extent entry having a reference to the uncompressed data of the write request,
generating a third extent entry having a reference to a remainder portion of the compression group that is not overwritten by the uncompressed data, and
associating the first extent entry, the second extent entry, and the third extent entry with the first block number.

4. The method of claim 1, further comprising:
determining whether the partially overwritten compression group including the uncompressed data should be compressed;
deferring compression of the partially overwritten compression group if the partially overwritten compression group should not be compressed; and
compressing the partially overwritten compression group if the partially overwritten compression group should be compressed.

5. The method of claim 4, wherein the determining whether the partially overwritten compression group including the uncompressed data should be compressed comprises:
determining whether a snapshot of data is to occur within a predetermined amount of time;
determining that the partially overwritten compression group should be compressed if the snapshot of data is to occur within a predetermined amount of time; and
determining that the partially overwritten compression group should not be compressed if the snapshot of data is not to occur within a predetermined amount of time.

6. The method of claim 4, wherein the determining whether the partially overwritten compression group should be compressed comprises:
determining whether the data in the compression group is cold data;
determining that the partially overwritten compression group should be compressed if the data in the compression group is cold data; and
determining that the partially overwritten compression group should not be compressed if the data in the compression group is not cold data.

7. A system comprising:
one or more processors; and
a non-transitory computer-readable storage medium communicably coupled to the one or more processors, the non-transitory computer-readable storage medium having stored thereon instructions executable by the one or more processors to cause the system to:
in response to receipt of a write request that indicates a file block identifier and that indicates data to be written, determine whether the file block identifier resolves to a compression group, the compression group comprising a group of data blocks that is compressed; and
partially overwrite the compression group while the compression group remains compressed, wherein the instructions to partially overwrite comprise instructions executable by the processor to cause the system to,
store the data of the write request as uncompressed data outside the compression group, and
update references used for resolving file block identifiers of the file to data blocks of the file, wherein the instructions to update comprise instructions executable by the processor to cause the system to update the references to map the file block identifier to the compression group and to the uncompressed data;
determine whether a predetermined criteria is violated by the partial overwriting of the compression group, wherein the predetermined criteria is selected from a group consisting of a system usage guarantee, a space usage guarantee, and a user-defined criteria; and
in response to a determination that the predetermined criteria is violated, compress the partially overwritten compression group.

8. The system of claim 7, wherein the instructions to update references comprise instructions executable by the one or more processors to cause the system to add an indirection reference to an indirection block of the file, wherein the indirection block includes a first reference to the data blocks of compression group and the added reference references the uncompressed data.

9. The system of claim 7, wherein the instructions to partially overwrite include instructions executable by the one or more processors to cause the system to:
allocate an extent identifier;
determine an offset into an existing extent associated with the compression group, the offset comprising a difference between a first block number provided in the write request and a second block number for a start of the existing extent, wherein the file block identifier is the first block number;

in response to a determination that the offset is non-zero,
generate a first extent entry having the allocated extent identifier and a reference to a start of the compression group,
generate a second extent entry having a reference to the uncompressed data,
generate a third extent entry having a reference to a remainder portion of the compression group that is not overwritten by the uncompressed data, and
associate the first extent entry, the second extent entry, and the third extent entry with the first block number.

10. The system of claim 7, wherein the instructions further comprise instructions executable by the one or more processors to cause the system to:
determine whether the partially overwritten compression group including the uncompressed data should be compressed;
defer compression of the partially overwritten compression group if the partially overwritten compression group should not be compressed; and
compress the partially overwritten compression group if the partially overwritten compression group should be compressed.

11. The system of claim 10, wherein the instructions to determine whether the partially overwritten compression group should be compressed comprise instruction executable by the one or more processors to cause the system to:
determine whether a snapshot of data is to occur within a predetermined amount of time;
determine that the partially overwritten compression group should be compressed if the snapshot of data is to occur within a predetermined amount of time; and
determine that the partially overwritten compression group should not be compressed if the snapshot of data is not to occur within a predetermined amount of time.

12. The system of claim 10, wherein the instructions to determine whether the partially overwritten compression group including the uncompressed data should be compressed comprise instructions executable by the one or more processors to cause the system to:
determine whether the data in the compression group is cold data;
determine that the partially overwritten compression group should be compressed if the data in the compression group is cold data; and
determine that the partially overwritten compression group should not be compressed if the data in the compression group is not cold data.

13. A non-transitory computer-readable storage medium embodied with executable instructions to:
in response to receipt of a write request that indicates a file block identifier and that indicates data to be written, determine whether the file block identifier resolves to a compression group, the compression group comprising a group of data blocks that is compressed; and
partially overwrite the compression group while the compression group remains compressed in response to a determination that the file block identifier resolves to the compression group, wherein the instructions to partially overwrite comprise instructions to,
store the data of the write request as uncompressed data outside the compression group, and
update references used for resolving file block identifiers of the file to data blocks of the file, wherein the instructions to update comprise instructions to update the references to map the file block identifier to the compression group and to the uncompressed data;
determine whether a predetermined criteria is violated by the partial overwriting of the compression group, wherein the predetermined criteria comprises at least one of a system usage guarantee, a space usage guarantee, and a user-defined criteria; and
in response to a determination that the predetermined criteria is violated, compress the partially overwritten compression group.

14. The non-transitory computer-readable storage medium of claim 13, wherein the instructions to update references comprise instructions to add an indirection reference to an indirection block of the file, wherein the indirection block includes a first reference to the data blocks of the compression group and the added reference references the uncompressed data.

15. The non-transitory computer-readable storage medium of claim 13, wherein the instructions to partially overwrite comprise instructions to:
allocate an extent identifier;
write an extent entry in a first sorted data structure, the extent entry including the allocated extent identifier, a reference to the uncompressed, and a compressed bit set to a predetermined value, wherein the allocated extent identifier is used to determine a location of the extent entry in the first sorted data structure;
select an entry in a second sorted data structure for a file block identifier corresponding to the uncompressed data in the write request; and
overwrite an extent identifier in the selected entry with the allocated extent identifier, wherein the file block identifier is used to determine a location of the selected entry in the second sorted data structure.

16. The non-transitory computer-readable storage medium of claim 13, wherein the instructions further comprise instructions to:
determine whether the partially overwritten compression group including the uncompressed data should be compressed;
defer compression of the partially overwritten compression group if the partially overwritten compression group should not be compressed; and
compress the partially overwritten compression group if the partially overwritten compression group should be compressed.

17. The non-transitory computer-readable storage medium of claim 16, wherein the instructions to determine whether the partially overwritten compression group should be compressed comprises:
determine whether a snapshot of data is to occur within a predetermined amount of time;
determine that the partially overwritten compression group should be compressed if the snapshot of data is to occur within a predetermined amount of time; and
determine that the partially overwritten compression group should not be compressed if the snapshot of data is not to occur within a predetermined amount of time.

* * * * *